(12) United States Patent
Triulzi et al.

(10) Patent No.: US 7,594,009 B2
(45) Date of Patent: Sep. 22, 2009

(54) MONITORING NETWORK ACTIVITY

(76) Inventors: Arrigo G. B. Triulzi, 25, Rue de Livron, Meyrin (CH) 1217; Adriaan W. Joubert, 10 Charalambous Mouskou Street, Nicosla (CY) 1101

(*) Notice: Subject to any disclaimer, the term of this patent is extended or adjusted under 35 U.S.C. 154(b) by 808 days.

(21) Appl. No.: 10/380,315

(22) PCT Filed: Sep. 13, 2001

(86) PCT No.: PCT/GB01/04107

§ 371 (c)(1),
(2), (4) Date: Jan. 12, 2004

(87) PCT Pub. No.: WO02/23805

PCT Pub. Date: Mar. 21, 2002

(65) Prior Publication Data

US 2004/0117478 A1 Jun. 17, 2004

(30) Foreign Application Priority Data

Sep. 13, 2000 (GB) ................. 0022485.7

(51) Int. Cl.
*G06F 15/173* (2006.01)

(52) U.S. Cl. ........................ 709/224; 726/26
(58) Field of Classification Search .............. 709/224
See application file for complete search history.

(56) References Cited

U.S. PATENT DOCUMENTS 5,835,726 A * 11/1998 Shwed et al. .............. 709/229
6,906,709 B1 * 6/2005 Larkin et al. .............. 345/419

* cited by examiner

*Primary Examiner*—Patrice Winder
*Assistant Examiner*—Mitra Kianersi
(74) *Attorney, Agent, or Firm*—Vierra Magen Marcus & DeNiro LLP

(57) ABSTRACT

A system for analysing network traffic, particularly to detect suspect packets and identify attacks or potential attacks. Data packets which meet defined criteria are detected and their details forwarded to a database server where the details are stored so as to be accessible for use in analysis in conjunction with the details of other detected packets. Packet detection uses a tap and a packet factory which creates a packet for analysis consisting of the received packet and a unique identifier. A series of adapters are used to apply functions to different parts of the packets, to detect those meeting the criteria.

23 Claims, 10 Drawing Sheets

MONITORING NETWORK ACTIVITY

PRIORITY CLAIM

The present application claims priority to GB Patent Application No. GB 0022485.7 dated 13 Sep. 2000, entitled "MONITORING NETWORK ACTIVITY".

The present invention concerns a system for monitoring network activity, and in particular is concerned with detecting potentially damaging traffic on a network.

Hacking into computer systems is a major problem facing users of networks. Attacks by hackers may for example be aimed at reading confidential information, at the destruction of data or at preventing a site from operating properly. For example there have been many instances of Distributed Denial of Service (DDoS) attacks in which a large number of computers are used to bombard a site simultaneously, thus preventing normal activities. To deal with hacker problems a number of "Intruder Detection Systems" (IDS) have been proposed, both commercially and under Open Source licences, but these have not been capable of dealing successfully with the amount of traffic generated by a major DDoS attack. A typical IDS system includes a so-called "sniffer" which analyses packets. Known IDS systems are designed as monolithic systems around a single computer which is assumed to act as the security analyst's console or as an alert system. When considering the bandwidth available to high-profile sites, it becomes clear that designing around a single computer on a LAN is of limited use.

Another problem is the detection of slow scans which are normally well below the warning threshold for IDS systems due to the often random time lags between events. Slow scans are of significant interest as the level of sophistication and dedication required clearly points to much more capable intruders than the usual heavy scans most IDS's detect which are the work of so-called 'script kiddies'.

An object of the system described herein is to provide a high-speed Intrusion Detection System (IDS) which will allow users to detect hostile network activity and take action based both on real-time information and correlation with historical data. It is specifically geared to reducing false positives, detecting subtle attacks and managing attacks rather than simply blocking them. The system is targeted at high-bandwidth sites such as large companies, data centres, co-location sites or e-commerce companies. There are a number of inventive aspects of the system disclosed in the present specification.

Viewed from one aspect there is provided a system for analysing network traffic, comprising the steps of using detecting means to detect data packets which meet criteria defined by one or more functions in the detecting means, forwarding details of the detected packets to data processing means, and storing details of the detected packets so as to be accessible for use in analysis by the data processing means in conjunction with the details of other detected packets.

Thus, in accordance with this aspect of the system disclosed in the present application, a database can be used to store detected packets. An analysis can therefore be carried out to determine whether, for example, a pattern emerges which might suggest a slow scan by a hacker. If such a pattern emerges, then the system may produce new functions so that the detecting means can detect appropriate packets—such as those originating from the hacker—and the necessary action taken. Thus, for example the detecting means may be set up to identify packets which are trying to access an unused port. If such a packet is detected, it is forwarded to the data processing means. Here it may be determined that this particular type of packet may have been encountered only rarely before, or not at all, in which case its details are stored but no further action is taken. However, the analysis may establish an emerging pattern suggesting that a slow scan is in operation, and action may then be taken. This aspect of the invention provides significant advantages over known systems where lack of historical data limits the analysis that can be done.

In one preferred embodiment the detecting means comprises a tap which receives packets of data from network traffic, and packet creating means or "packet factory" which for each received packet creates a packet for analysis which consists of the received packet and a unique identifier. The unique identifier may include an identifier for the tap and a time stamp. Preferably, an adapter is applied to a packet, giving a view on the contents of the packet. Packets meeting defined criteria are identified by applying functions to the view supplied by the adapter. In preferred embodiments, a plurality of adapters are provided which apply functions to different parts of a packet. Preferably, the functions applied to the packets are encoded into a function tree.

The method of detecting packets is inventive in its own right and thus viewed from another aspect the invention provides a system for detecting packets in network traffic which meet predetermined criteria, comprising a tap which receives packets of data from network traffic, and packet creating means which for each received packet creates a packet for analysis which consists of the received packet and a unique identifier.

Viewed from another aspect, there is provided a system for detecting data packets having specified characteristics in network traffic, comprising the steps of using detecting means to detect packets which meet criteria defined by one or more functions, wherein the detecting means comprises first means for copying all network data to second means which classifies packets in the data, information concerning the packets being transmitted to third means which applies at least one function to the information to determine whether the packets meet the specified criteria.

In accordance with these aspects of the systems disclosed in the present specification, the speed with which the process of detection can be carried out in increased significantly. A conventional system uses "sniffers" in the data lines which have been programmed in advance to identify certain types of packets in the stream of data. In accordance with this aspect of the invention, however, the first means will be in the data lines and will forward all data to the second means where the first stage of analysis takes place and packets are classified. The second means can be programmed to identify only specific packet types or even just a single packet type, and the packet types to be classified can be altered without interrupting operation of the system. In a practical application, a number of units would be provided, each with its own first, second and third means and each looking only for specific packet types. This increases the speed with which potentially dangerous packet types can be detected.

The combination of the above two aspects of the inventive system described in the present application is particularly advantageous.

Viewed from yet another aspect, there is provided a system for detecting data packets having specified characteristics in network traffic, comprising the steps of using detecting means to detect packets which meet criteria defined by one or more functions in the detecting means, wherein the detecting means comprises first means for copying network data to function applying means which analyses the data by applying at least one function, and wherein the at least one function may be varied without interruption of copying network data for analysis.

It would be possible to have a system in which, for example, packet detection is carried out at a site, detected packets are then transmitted to a remote database for processing, and then results are returned to the original site for action to be taken.

A significant feature of the preferred system is the ability to perform historical analysis and correlation on the traffic. This makes it possible to build up profiles of both attackers and attacks. A historical record is also extremely useful when prosecuting perpetrators.

Viewed from another aspect of the inventive system disclosed, there is provided a system for detecting and reacting to a denial of service attack over a network, in which a data processing system is programmed to detect a denial of service attack and to automatically re-route legitimate network traffic using additional bandwidth.

Viewed from another aspect of the inventive system disclosed, there is a provided a system for detecting data packets having specified characteristics in data traffic, in which multiple detecting means are used so as to provide information from multiple nodes, and data from the multiple nodes is correlated.

Viewed from another aspect of the inventive system disclosed, there is provided a method of detecting data packets having specified characteristics in network traffic, comprising the steps of using detecting means to detect packets which meet criteria defined by one or more functions in the detecting means, forwarding details of detected packets in the network traffic to data processing means, analysing the packets in the data processing means with reference to details of previous packets stored in a database, and if appropriate in accordance with the analysis generating new functions for use by the detecting means.

Viewed from another aspect there is provided a method of analysing packets of data from a network comprising the steps of receiving details of packets in data processing means, storing the packet details in a database accessible by the data processing means, and processing newly received details of packets by comparing them with information stored in the database in order to detect potentially harmful network activity.

The systems described need not be restricted to the detection of harmful activities by hackers. Functions could be chosen to check outgoing traffic from a site, thus looking for confidential information being transmitted or other unauthorised activity.

Other aspects include data processing means programmed to carry out the methods outlined above, and software which when running on data processing means will enable the methods to be carried out. Such software may be provided on a physical carrier such as a CD ROM or may be provided from a remote location such as a site connected to the Internet. The software may be only in respect of a particular part of the system, such as a database.

The preferred system in accordance with the above aspects is geared towards detecting subtle attacks and to managing attacks, as opposed to just blocking them. The objective is to allow users to detect hostile network activity and take action based both on real-time information and correlation with historical data. The system is targeted primarily, but not exclusively, at high-bandwidth sites such as large companies, data centres, co-location sites or e-commerce companies. There is a distributed design where the packets are "sniffed" off the network by one or more sniffers at wire speed and analysed in real-time on a separate computer. The system is designed to monitor all the links into the site concurrently, merging information about attacks from all links simultaneously. A Java interface to access the information runs on one or more security analysts' computers. The preferred system is readily scalable and has the ability to monitor multiple links.

Preferred embodiments of the invention will now be described by way of example and with reference to the accompanying drawings, in which.

Figure 1:
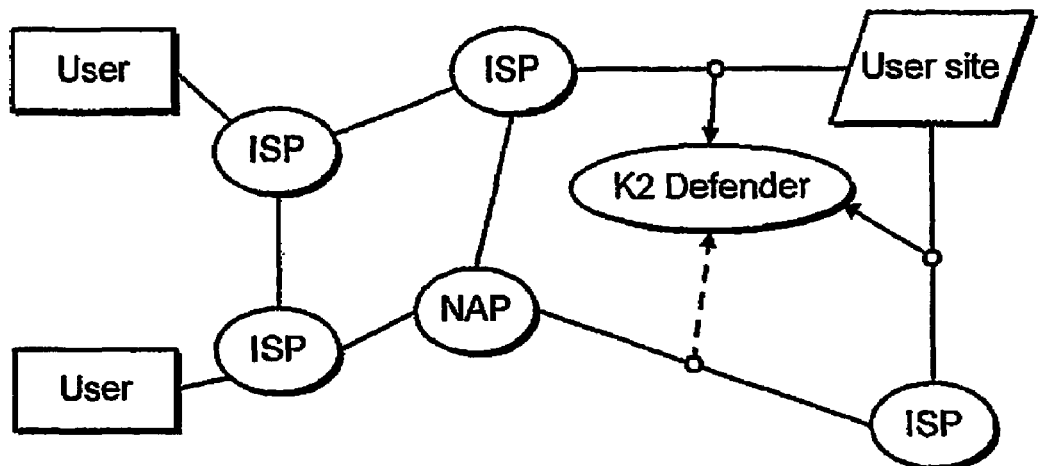
FIG. 1 is a diagram showing how the system monitors multiple links into a site.

The system described is a high-speed Intrusion Detection System (IDS) built around Compaq Non-Stop (Trade Mark) technology.

The bandwidth for major sites is already measured in Gbit/s, with the largest web-hosting companies being fed by multiple SONET fibre pairs at OC-48 (STM-16) speeds, 2.488 Gbit/s, or above. At these speeds it becomes necessary to consider a distributed design where the packets are "sniffed" off the network by one or more sniffers at wire speed and analysed in real-time on a separate computer. The present system is designed to monitor all the links into the site concurrently, merging the information in real-time. A Java interface to access the information runs on one or more security analysts' computers.

Although the system described is entirely network based, it can also include host-based information, e.g. information from log files, "whois" databases, standard XML (SNML-Standard Network Markup Language) or other IDS products via suitable CORBA interfaces.

Every component of the system is a CORBA object (Common Object Request Broker Architecture, a standard developed by the Object Management Group (OMG)), which allows the management interface to locate and interact directly with the different components. Every object is designed to allow configuration at run-time through said Java interface and supports a configuration stored in the central database.

The system consists of three main components:

1. Packet sniffers, which take a copy of every single packet of traffic on the wire, and perform initial high-speed selection and analysis;

2. A database engine, which stores and analyses both real-time data and historical information providing alerts and reactions;

3. A Java front-end, which provides the interface between the analyst and the system, displays information and allows sophisticated queries on the data, as well as reconfiguration of the system.

The large incoming bandwidth is monitored by as many sniffers as necessary, each taking a part of the traffic, and then forwarding suspect packets to the database engine. There the data is analysed in real-time for known attacks and stored for historical correlation to be done in near real-time. Alerts are sent to the Java interface and also by other mechanisms such as GSM phone, pager, etc. The different components of the system are connected by a secure private network or a secure VPN system over a shared network.

Apart from detecting known attack patterns and illegal packets, the system also supports the concepts of hot lists and white lists. A hot list is a list of attack patterns, packet signatures or source addresses that have been noted in recent suspect packets and demand special scrutiny. An example is a source that has probed unused ports: such a source is entered onto a hot list to raise an alert if there are more probes, which would point to systematic information gathering. Hot lists are usually updated automatically, but can be added to manually. White lists work on the principle that anything that is not specifically permitted is suspect. For example the connection to a web server on port 80 is explicitly permitted, but an attempt to telnet to the machine is automatically seen as suspect and is noted.

The use of white and hot lists is especially advantageous in that it makes it possible to detect suspicious packets without relying on a pattern, but purely on the basis of source or destination of a packet. As most packets are logged on the basis of a pattern, this is a huge advantage, as the development of patterns always lags the development of new attacks. In a further development of the system, patterns of normal traffic will be built up and there will be detection of packets that seem abnormal. As an example, if most packets to a specific service are small, say below 512 bytes, and suddenly a 4 k packet comes along (a defragmentation module would pick up the size of large packets), then there is a possibility that this is an attempted buffer overflow. Normal IDSs could not log these packets, as they work on the principle that a suspicious packet generates an alert, so that this type of behaviour would generate far too many alerts. With the present system such packets can be logged and only reported if more suspicious traffic is detected. The detection of such traffic is also crucial for the development of new attack patterns.

For both of these mechanisms to be useful in practice, it is essential that the lists can be updated through remote calls to the sniffers at run-time. In fact, the ability to tune and reconfigure the system at run-time is one of the design goals and motivated the use of CORBA as middleware. It is essential that these lists are kept updated, and there may therefore be a periodic automated systems scan to verify that no network changes have taken place or to update the current lists.

A major problem with conventional IDSs is that they often lead to a large number of false alarms. A common remedy is to raise the level at which alerts are raised, which means that subtle information gathering goes undetected. The present system will not raise alerts when simple probes are detected, but remembers these and raises an alarm if a suspicious combination of events following the probes is seen.

The question of response is complex and extends into legal issues. It would be particularly useful if it were possible to stop attacks at source, but this might require actions which violate the laws of one or more countries traversed by the intruder. There is therefore a need for a localised response which would, in the example of DDoS, bring on additional bandwidth on separate autonomous systems re-routing legitimate traffic or other strictly local means of damage limitation. For sophisticated attackers, who need to be managed rather than just blocked—otherwise they would only be back in a different guise—a possible solution is to re-direct them to a fake honey pot system, giving time to gather more information about them.

Referring now to the drawings, FIG. 1 shows how the system monitors multiple links into a site so that it can correlate intrusions via multiple routes. In this and FIG. 2, the system is referred to as "K2 Defender". The figure shows multiple users, ISP's, NAP and a User site.

Figure 2:
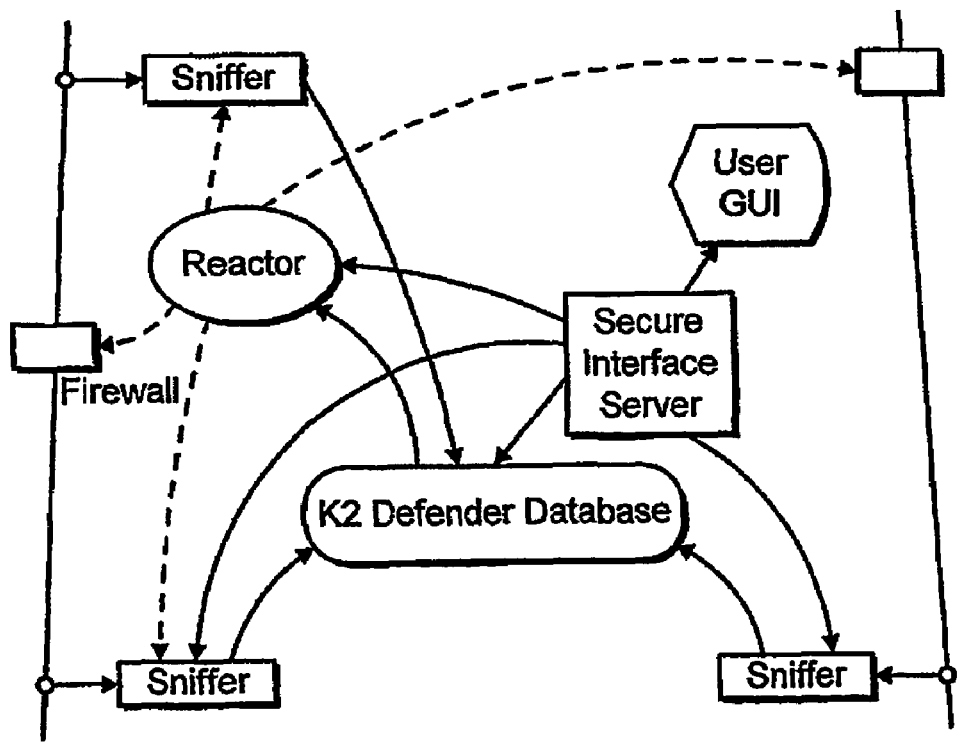
FIG. 2 is an overview of an embodiment of the system.

FIG. 2 is an overview of the system. Sniffers read the data from the incoming pipes and report relevant packets to a central "K2 Defender" logging server hosting a database, which in turn reports attacks to a customized reactor. A secure interface server provides an interface to all components of the system for configuration and interrogation, and is associated with a User GUI. A firewall is also shown.

Figure 3:
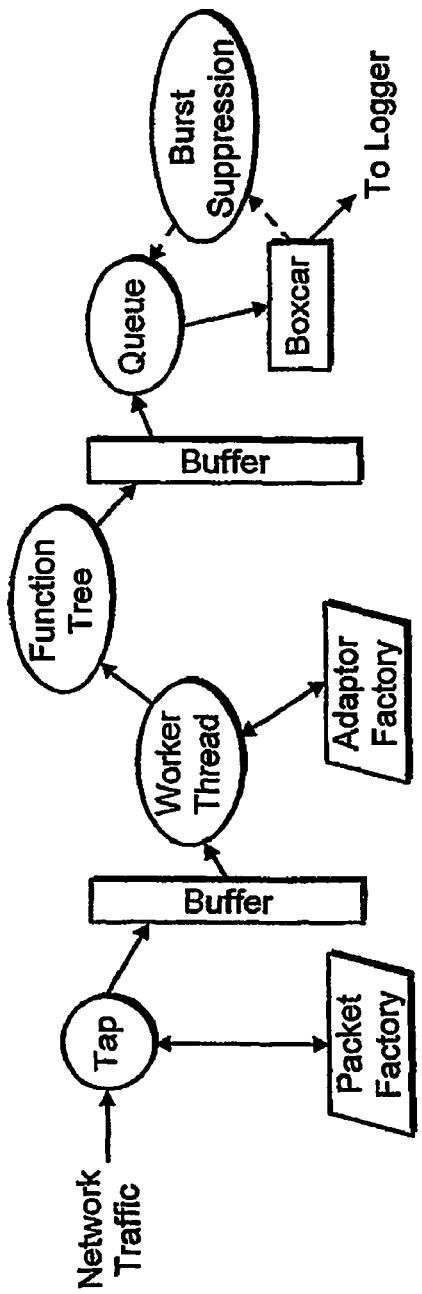
FIG. 3 shows details of a packet detecting part of the system.

FIG. 3 is a schematic of the main objects in a sniffer. Packets are captured from the network and an initial filtering step is done in a tap. A packet factory creates a CORBA data structure from a memory pool and inserts it into a buffer. Worker threads, communicating with the adapter factory, pick up the packets and process them through a function tree. If the packets need to be logged, they are again buffered, from where a priority queue picks them up and transmits them to a logger using a "boxcar" technique, and incorporating burst suppression.

The sniffer is based on a high-speed capture engine which copies packets off the wire. The sniffer needs to be sophisticated enough to reduce the amount of data logged to a minimum, without deleting valuable information. Functions geared to detecting DDoS attacks will e.g. look at the frequency of certain packets and only report that these packets are part of a denial of service attack, rather than logging all the individual packets.

To ensure that attackers cannot break into the system, the only connections to the public Internet system are at the sniffers and the return wires are cut, so that no packets can ever be sent through the interface connected to the incoming data link. A second interface onto the private network is used to communicate with the database server.

Under normal circumstances sniffers are stateless, as this makes it possible to write filters with lower memory and CPU requirements. To detect some types of attacks it is useful to have some state in the sniffer, and here the distributed nature of the present system is valuable, as it is possible to dedicate a separate sniffer to stateful functions. An example where statefulness is important is in monitoring the number of dropped packets when a session is being usurped at the start of a man-in-the-middle attack, or in detecting the large number of hanging connections in a denial of service attack against a specific machine. Similarly a DDoS based upon a large number of half-open connections could be detected and reacted upon by sending a reset (RST) for every port opened on the attacked machine.

Another area where statefulness is useful is to detect sudden peaks in the number of packets directed at specific hosts or specific ports. It is very easy to keep these statistics and raise and alert when changes in traffic patterns are detected even if the individual packets seem harmless, and are not logged to the database.

To make the system easily extendible, the packet sniffer contains no knowledge of specific types of packets. Rather the packet factory creates structures from the data read off the wire that are CORBA types, so that they can be transmitted easily. Consequently the system can easily be extended for different protocols, by adding a modified tap and a different packet factory.

An initial filtering step is performed at this stage.

At this point a unique identifier consisting of 1. the unique number of the sniffer (2 bytes) and,
2. a time stamp (8 bytes)

are added to the packet. The resolution of timers on most machines is not good enough to make the (sniffer, timestamp) table unique, hence the time is modified artificially to give a unique nanoseconds value since 1 Jan. 2000. The seconds are calculated as Julian seconds plus a second fraction with whatever resolution the hardware clock provides. To resolve the uniqueness problem, a sequence number counter is reset at the start of every interval that represents the system's timer resolution, e.g. 1 ms. As new packets are received, the counter is incremented and added to the time as a nanosecond value, thus making the timestamp unique.

On IP networks a capture library, libpcap, which is used in the tap to capture packets, can filter packets. This makes it possible to discard some local traffic (such as ARP), if desired, and also to split work over several sniffers, by e.g. dedicating one sniffer to TCP traffic and another to all other traffic. With some network cards filtering can even be done at the hardware layer with appropriate patches to libpcap.

It is imperative that the sniffer does not start dropping packets at high data volumes. Consequently the path in the initial thread in the sniffer is kept very short. A packet is received off the wire into a static buffer; the packet factory copies it into a structure allocated from a memory pool, and puts a pointer to this structure into a buffer. The buffer grows dynamically to accommodate peaks in traffic.

Timestamps on data sent by the sniffer will be generated from at least two secure NTP sources distributed throughout the private Defender network. These are based on DES authentication technology which, although slightly out-dated still provides a rather serious challenge for high-speed key recovery. NTP supports public-key cryptography which will be used for initial key exchange and key refresh. Data on the sniffer is checksummed and a secure digest is generated by SHA-1. This is encrypted with a sniffer-specific key. This is added to the sniffer data.

Security Issues

When an attack is detected, the attack data can be sent off to a trusted third-party, which is assumed to act as a notary for this data and should apply relevant security measures, e.g. printing out data on receipt in readable format, further secure timestamping using an internal source, cryptographically strong signing. Given the amount of data which might be sent from each of the sniffers it is not feasible to send all the collected data to a trusted third party. Rather, only relevant Alerts, with the associated packets, will be sent from the database as opposed to each and every packet.

There is no way to ensure that the data being received by the sniffer is valid. If fake data is being generated to cause particular fabricated alerts to incriminate someone it is impossible to know at the sniffer level or later. Furthermore, it is also very difficult to provide secure authentication at the sniffer level which will stand legal examination in court. Secure signing and/or encryption at the sniffer level requires a private key to be stored on the system. There are a number of available "cryptography cards" for both Intel (Trade Mark) and Alpha-based (Trade Mark) systems which might make this possible. One of the key issues which is addressed by using a trusted third party is guaranteeing the sequencing and timestamping on Alerts. Components are under the control of the system it is feasible to be able to fake timestamps or add data to the database without it being generated by sniffers. By sending data to a trusted third party as soon as possible (and only if relevant) it is possible to attempt to minimise the opportunities for a legal challenge.

Packet Adapters

Figure 4:
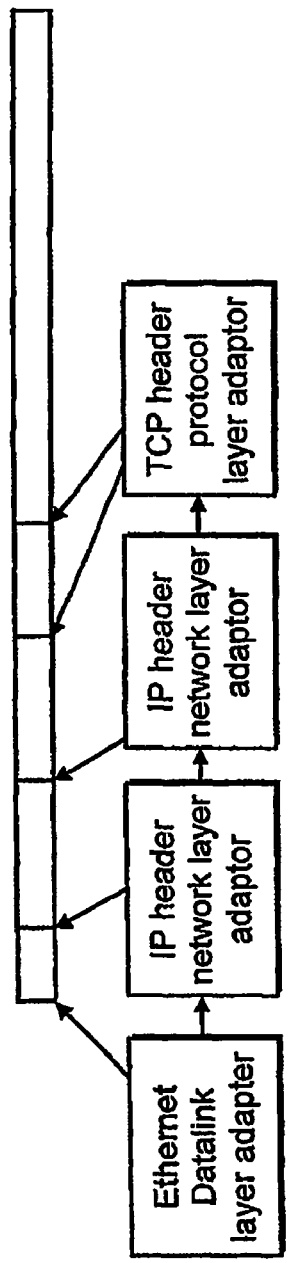
FIG. 4 shows an example of a list of packet adapters for an ethernet link.

The initial filtering of the packets on the sniffers is performed with the assistance of a set of packet adapters. These objects overlay structures onto parts of a packet to provide easy access to a variety of relevant variables in the packet header. FIG. 4 is an example of a list of packet adapters for an ethernet link. A TCP/IP packet is tunnelled in an IP data stream. Every adapter overlays the correct data structure onto the header section, and contains a pointer to the beginning and end of its section, to the end of the packet and to the next adapter if present. For the example of a TCP/IP packet that is tunnelled over an IP ethernet link, there would be four packet adapters:

1. A datalink layer adapter for the ethernet header
2. A network layer adapter for the first IP header
3. A second network layer adapter for the tunnelled IP header
4. The protocol layer adapter for the TCP header Every packet adapter has a static size and is allocated transparently from a memory pool; it also contains a factory to generate a packet adapter for all types of adapters that can follow it. This approach keeps access to the different parts of a packet simple and flexible. It is easy to add adapters to accommodate for example IPv6 with its simple initial header and variety of extension headers. The list of packet adapters is built in a lazy fashion, i.e. is extended on demand.

Packets are tagged for logging, or other analysis, by applying a set of rules to each packet, which for efficiency are encoded into a function tree. Each rule maps onto a path through the tree from the root node to one of the leaves. Many rules are very similar and share many of the checks that must be applied to each packet, and so the use of a tree structure allows these checks to be performed much more efficiently than a naive application of each rule in turn. The tree is organised in such a way that common conditions are tested early, in order to reduce the number of tests that need to be applied to a packet, and to keep the number of times that they are applied to a packet to a minimum. This approach is used throughout the system.

The function tree is designed to be highly flexible and yet easily configured, with a wide variety of fully interoperable node types, each of which applies a particular kind of check on the packets that pass through it. The tree is constructed automatically from the XML specifications of the rules that it implements. The addition and removal of specific rules from the tree is transparently translated into the necessary addition, deletion or reconfiguration of specific nodes, all of which can be performed at run-time whilst the tree is being used.

The flexibility of the function tree derives from the flexibility of the decision nodes, each of which performs the following actions on each packet:

1. The appropriate packet adapter is added if required, e.g. if the node is configured to check the TCP destination port, a TCP adapter is added if not already present;
2. If a hash of exclusive functions is available, the hash key is created and a node picked from the hash table. These must be mutually exclusive conditions, e.g. specific destination port numbers;
3. If a list of conditional functions is present, a list of guards is applied and, if a guard returns true, the packet is passed to the associated child node.

Variations on this theme exist, e.g. boolean nodes, which have an if-then-else decision structure to choose between conditional child nodes. Additionally link nodes provide connectivity and host the functions that are applied to every packet.

Whenever a packet is passed to a function or a child node, these return a logging value, indicating whether the function should be logged to the database or not. The log values become larger with increased severity of the threat, and if the maximum value is reached at any point, all further tests are ignored and the packet is returned immediately for logging.

Figure 5:
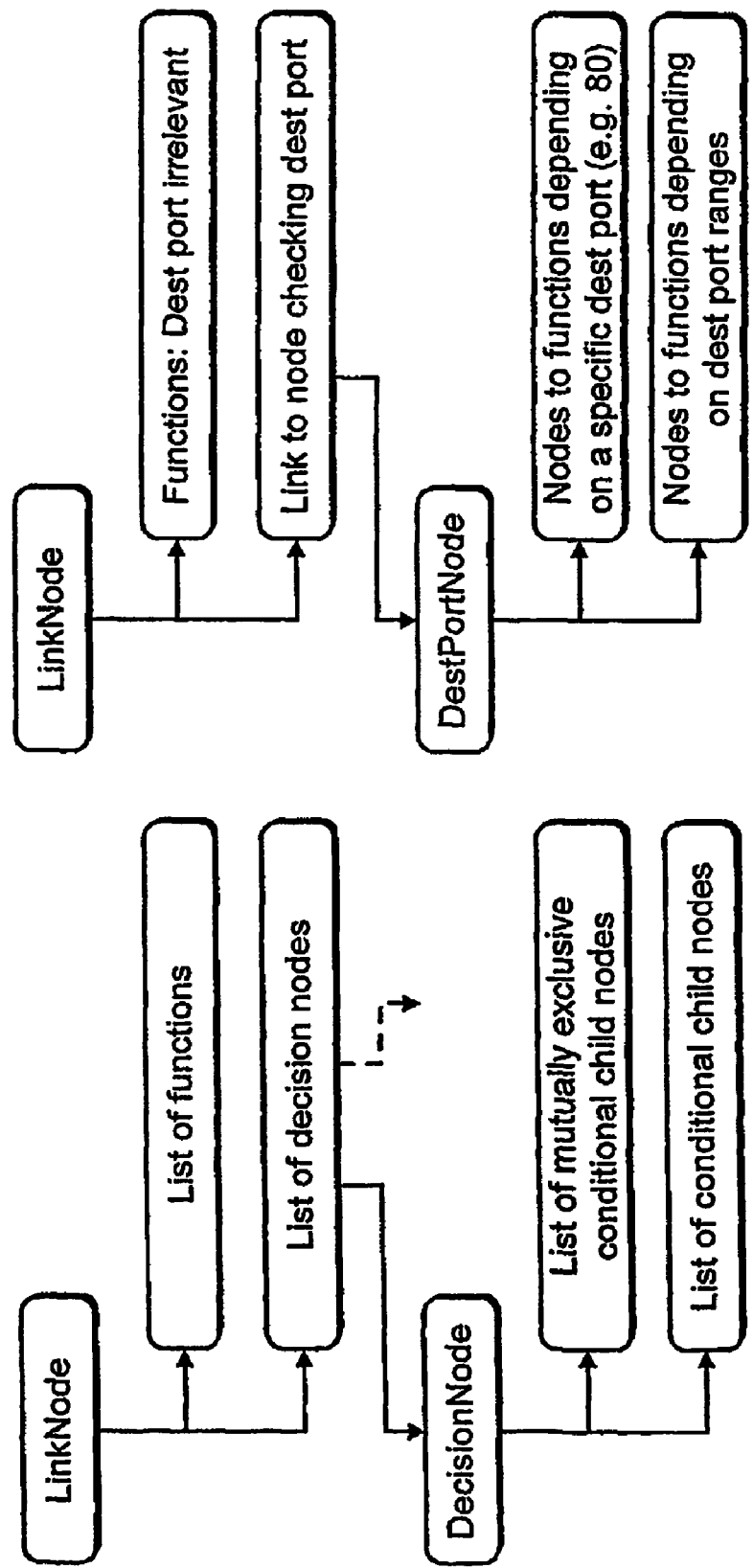
FIG. 5 is a schematic of a pair of nodes in a function tree.

FIG. 5 is a schematic of a pair of nodes in the function tree. Link nodes contain a list of functions and a list of decision nodes, that are executed whenever the node is reached. Decision nodes contain a list of child nodes depending on a specific, exclusive condition for a packet field, or depending on a non-exclusive condition on a packet. On the right hand side, a Link node contains functions with the Dest. port being irrelevant, and a link to a node checking the Dest. port. The Dest Port Node contains nodes to functions depending on a specific dest port (e.g. 80) or nodes to functions depending on dest port ranges.

Figure 6:
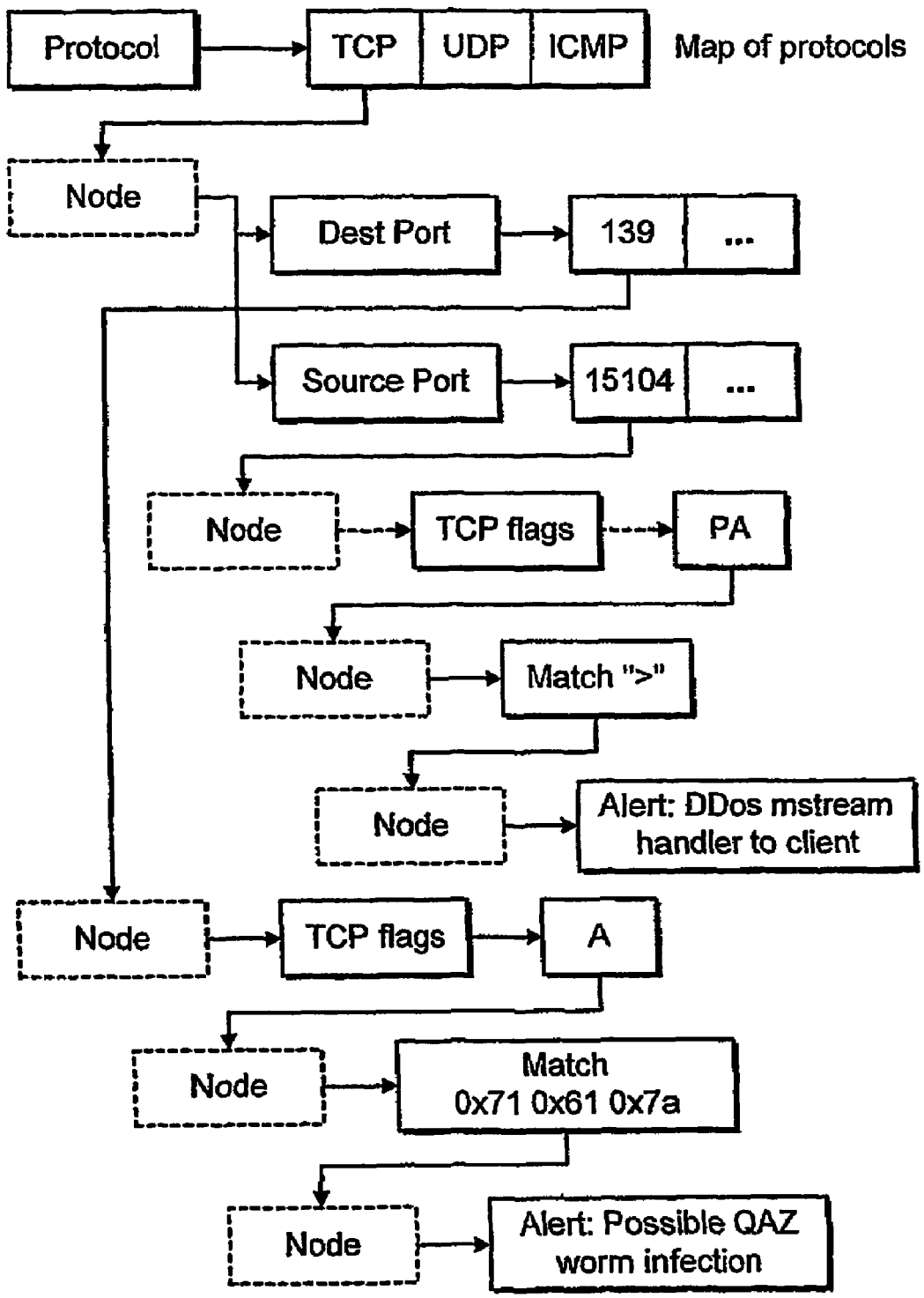
FIG. 6 is an example of a function tree.

FIG. 6 is an example of a very simple function tree that tests for a packet for a particular DDoS attack client command (matching ">") and a "QAZ" worm infection.

Packets are processed through the function tree by multiple threads, which pass on any packets with a non-zero log level to a queue for dispatch to the logger (indicated by the second buffer of FIG. 3). Packets are read from this queue and, in order to reduce the load on the network and messaging overhead, are sent to the logger in groups ('boxcars'). These boxcars fill with packets as they are arrive from the function tree and are periodically dispatched to the logger. The intervals at which boxcars are dispatched is chosen on-the-fly, and is reduced as high log-level packets are entered into the boxcar. This way reset limits on the time a packet can be delayed in the boxcar can be honoured. The thread that sends each boxcar to the logger will not release the memory holding the packets until it receives a return message from the logger indicating that they have successfully been logged.

As mentioned above, most sniffer functions are stateless to increase the speed at which packets can be processed. Thus every packet is seen as an individual packet without context, and consequently a crude port scan over all ports of a machine will trigger an alert for every non-white-listed port on the system. While it may be desirable to keep some statistics on the port scan, it is futile to log all the individual packets and may even be detrimental to the overall health of the system. In some cases, the easiest solution is to add stateful functions to the sniffer.

In other situations a system could be flooded with a large number of different attack packets, in effect a denial of service attack.

In order to avoid over-loading the system with large numbers of attack packets, a burst management system is introduced. The boxcars in the sniffer are configured to be fairly large, so that they will only be dispatched on a timer pop under normal circumstances. If they fill up before the timer pops it signifies that a large number of threatening packets are coming in. Instead of sending the whole boxcar off, all the packets are again processed by a function tree. Serious threats are left in the boxcar and sent to the logger, but for other patterns, representative packets are chosen and a separate alert is generated. For example, for a portscan, the range of the portscan and the number of packets is kept, and only a single representative packet is stored in the database.

The sniffer contains a management interface that is a CORBA object. Consequently a sniffer can be located through the CORBA naming service, and its individual components can be configured, suspended or activated, and tuned to specific traffic types, through the Java interface at runtime. In particular, functions can be loaded and configured at runtime, which is particularly beneficial should an analyst wish to study traffic which looks suspicious but to which no function is exactly tailored.

As it is possible to interrogate and manage individual functions through CORBA from the Java interface, it is also possible to extend the capabilities of a sniffer by having functions that collect statistics on packets, for example, rather than vetting them for attacks.

The configuration for sniffers, including the default set-up for the function tree is stored in the database and served by a configuration server. The parameters for individual functions are stored in XML and all standard XML tools can be used to view/edit and determine the validity of these strings. For the manageability of such a complex system, which needs to run a 24×7 service, it is of utmost importance that the configuration is stored centrally in a database, so that sniffers can be reconfigured without taking the system down.

The design of the sniffer is influenced by the performance requirements. Space for captured packets is allocated from a memory pool, which is between 4 and 45 times faster than the system allocators on various known machines. The initial path of the data to the first buffer is very short, and thus fast. Great care has been exercised to avoid all memory locks, as these caused unacceptable overhead. Due to the dynamically expanding buffers, the sniffer can cope with very high loads, without packets being lost.

Key points are therefore that the system filters data to detect suspicious packets and reduce logging;
dynamically configurable;
easily extensible design;
stores configurations in a database in XML;
supports multiple priorities for logging packets; and
scalable through the use of threads.

The database is the core of the system and has three levels of prioritised service:

1. real-time: network attack detection, alert and network response (Electronic Counter-Measures), urgent pattern modification in response to attack;

2. near real-time: historical correlation, data mining in response to analyst queries, pattern modification; and 3. batch: pattern update, slow scan detection, data cleaning, periodic report preparation.

As the database system is the central point in the system, this is the main area in which bottlenecks are to be expected. When coping with input from multiple sniffers on multiple high-speed links, enormous amounts of data may have to be processed and stored. At present, the preferred system capable of coping with such demands, and scaling with Internet-style growth in traffic, is the Compaq Himalaya (Trade Mark) platform.

CORBA provides scalability in the number of servers that can be deployed around the preferred platform. For example it is possible to connect multiple sniffers to the Himalaya and farm out reactions over multiple reactors.

There could however be scalability problems for the processes on the database server, and this is where the characteristics of the preferred platform are valuable. All objects in the database server are replicated inside transaction monitors, so that there are a configurable number of processes available to perform a specific function. The operating system does automatic load-balancing, so that requests go to the CPU with the lowest load. To get the full advantage of this architecture, objects need to be context free as far as possible. If context needs to be kept, it can be kept in the database.

The way in which the preferred platform caches tables, means that access to a database table can be as fast as access to shared memory. The database itself can run over multiple processors and multiple disks in parallel and is uniquely scalable.

Another advantage of the distributed design is that it is very easy to add new objects with new functionality to the system—often without taking the rest of the system down. For example, new data series servers or surveyors can be added without taking any of the other processes down.

Figure 7:
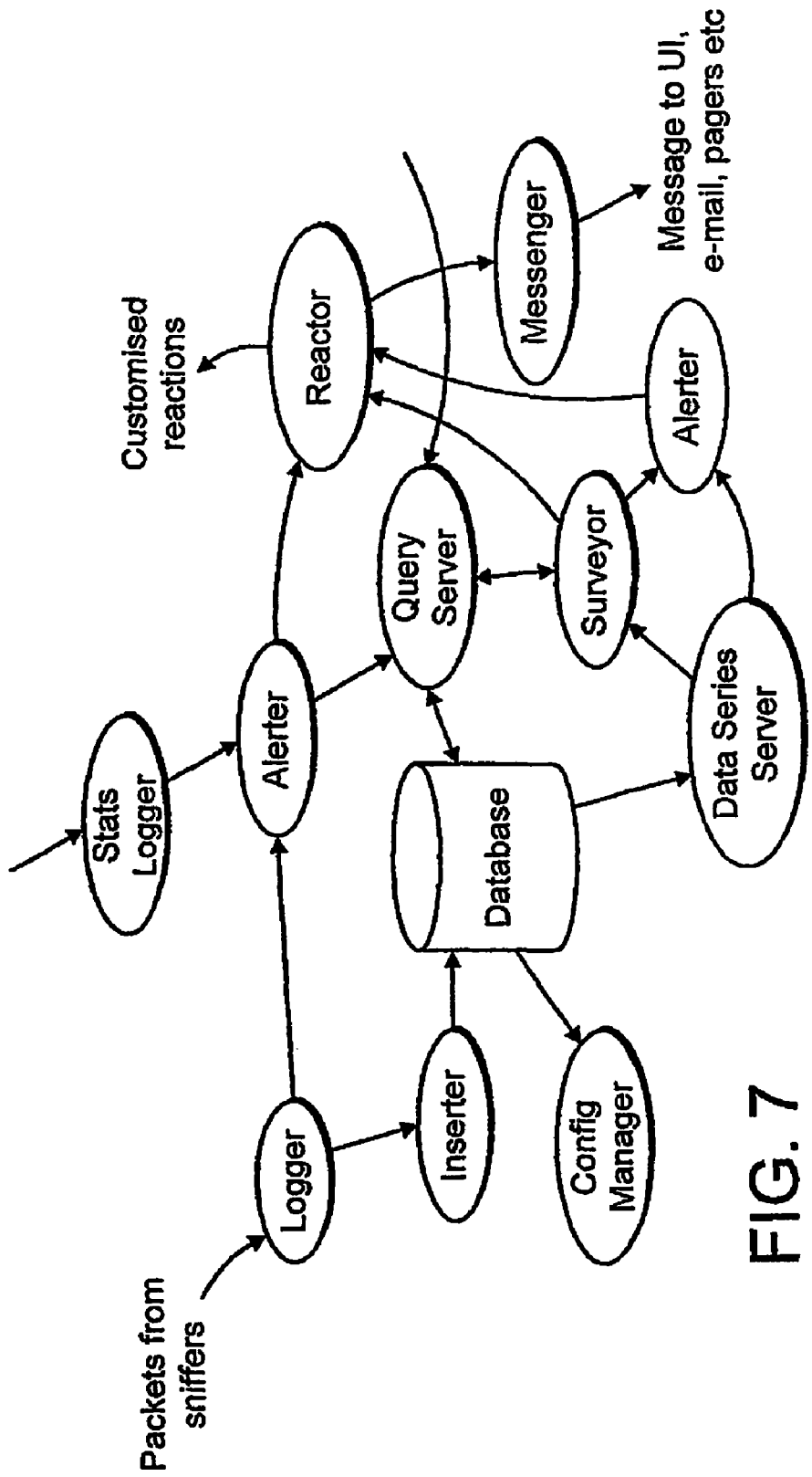
FIG. 7 is a schematic of the objects running in an embodiment of the system.

FIG. 7 is a schematic of the objects running on the preferred system. The figure shows the logger receiving packets from sniffers, linked via an inserter to the database. The logger is also linked to the alerter, together with a stats logger. The alerter is linked to a reactor, which produces customised reactions, and to a query server. The reactor is linked to a messenger which can send messages to the user interface, e-mail, pagers etc. The query server is linked to the database and to a surveyor which in turn is linked to the reactor, an alerter linked to the reactor, and a data series server. The data series server is linked to the database and to the alerter. Also linked to the database is a configuration manager.

A dilemma when storing network packets is that a large number of packet structures exist, so that it is impractical to define a separate table for every type of packet. This suggests that it may be better to store all packets in a single table and to avoid splitting out variables from the packet headers into separate columns. However this is not a practical solution, as it makes querying the table very hard, and largely nullifies the advantage of using a database. Consequently, a compromise solution is required.

For the average IP network the majority of packets will be TCP packets, with a fair number of UDP and ICMP packets sprinkled in between. Thus the default configuration will contain four tables:

1. TCP packets
2. UDP packets
3. ICMP packets
4. All other IP packets

In every table as much useful information is broken out into separate columns as possible. For example for all packets IP header information, such as the source and destination addresses is available in separate columns. For TCP packets further information from the TCP header is available, such as ports, TCP flags as well as indicators for the presence of specific TCP options. Breaking out a lot of information makes it possible that even complex queries do not have to look at the raw packets.

The primary key for these tables must be constructed entirely from the packet information received from the sniffer, so that objects receiving a packet via a fast-path can pinpoint it in the database. The unique packet information that the packet factory attaches to every packet provides enough information for a primary key.

When querying for packets that are not in a specific table, e.g. a packet that is tunnelled over IP, the IP table needs to be scanned and some processing on the raw packet may be required. In general this is not a big issue, as the IP table should be small. Some sites may, however, carry a large amount of tunnelled traffic, in which case tables for IPIP or IPsec may be required.

In general non-IPv4 networks need to be supported as well and tables for these have to be inserted. This mandates that the design must accommodate easily adding new tables and allocating data to these. By using the general function tree concept throughout, e.g. when deciding which function to use to write a specific packet to the database, this flexibility is built into the system.

Figure 8:
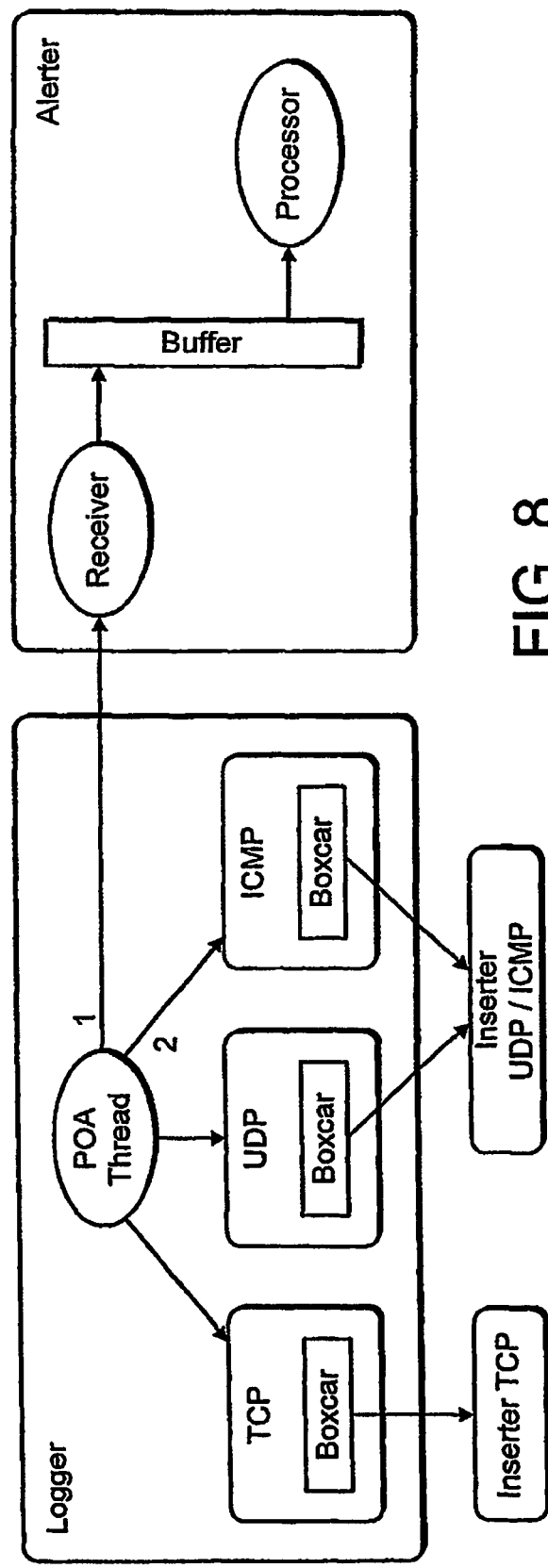
FIG. 8 illustrates the use of a logger and an alerter.

The bulk of the front-line work is to receive raw packets from the sniffers and file them in the database. Along with the raw packets the database will receive an indication of how serious the threat from a specific packet is considered to be. High priority packets are reported via method invocations to the Alerter process, as shown in FIG. 8. From a POA thread the Logger first reports high priority messages to the Alerter, where they are received by a receiver, buffered, and sent to a processor. The Logger then sorts and partitions all packets so that they are sent in boxcars to server classes responsible for updating specific tables. In this Example there are boxcars for TCP, UDP and ICMP, an Inserter for TCP and a combined Inserter for UDP/ICMP. In order to avoid delays, the Alerter simply stores the packets in the internal buffer and returns immediately.

Subsequently the Logger needs to write the packets to the database. Due to the required flexibility in the number of different tables, this may seem quite a daunting task. Furthermore, SQL queries on the preferred platform are currently process blocking, which is unacceptable in a process such as the Logger. In practice the latter problem provides the solution to the first.

In order to be able to write packets to the database concurrently, it is common practice on the preferred system to have a separate class of CORBA servers, the Inserters, that execute the SQL queries. In other words, every table will have its own Inserter implementation, but they will all implement a common CORBA interface.

Although this seems to have complicated the insertion process, it is easy to accommodate this flexibility in the Logger. Using the same function tree that is implemented for the sniffer, it is easy to define the appropriate XML to split the packets by protocol and submit them to the correct inserter.

Again, packets are written to a boxcar, and once the boxcar is full or a timer pops, the whole boxcar is sent to the correct Inserter.

Figure 9:
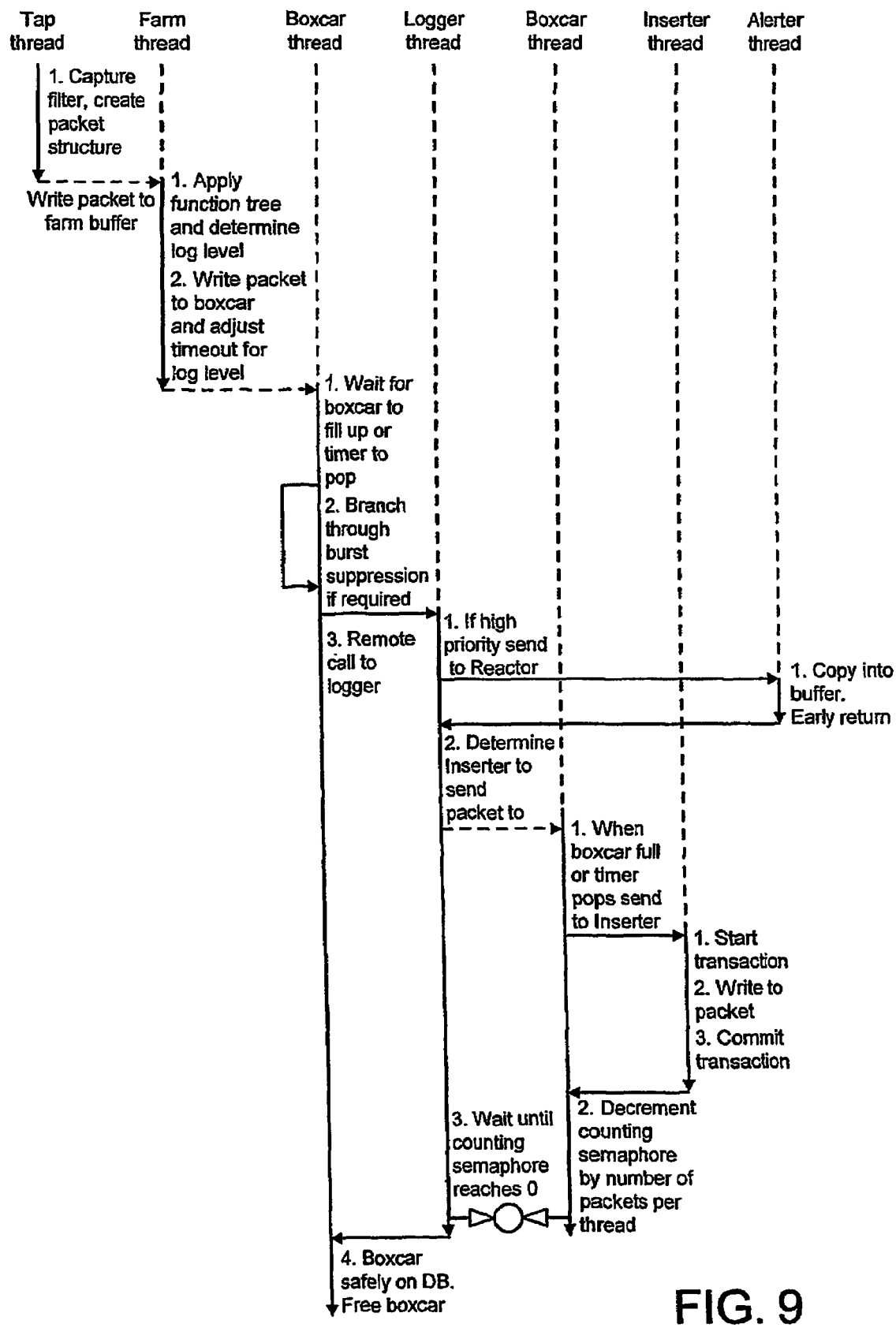
FIG. 9 shows the path of a packet from capture to submission to the database.

FIG. 9 illustrates the path of a packet from capture to submission to the database. The boxcar thread in the Sniffer only releases the boxcar of packets when they are safely written to the database. If any call fails in any part of the chain, the packets are resent. There are shown a tap thread, a farm thread, a boxcar thread, a logger thread, an inserter thread and an alerter thread. In the tap thread, there is capture, filtering and the creation of a packet structure which is written to a farm buffer. In the farm thread, a function tree is applied to the packet and a log level determined. The packet is written to the boxcar and the timeout adjusted for the log level. In the boxcar thread, the system waits for the boxcar to fill up or the timer to pop. There is branch through burst suppression if required. A remote call is made to the logger. In the logger thread, if it is high priority it is sent to the reactor. It is copied into a buffer in the Alerter thread, and there is an early return. In the logger thread, there is determined the Inserter to which the packet is to be sent. The packet is sent to a boxcar, and when the boxcar is full or the timer pops, it is sent to the inserter thread. In that thread, a transaction is started, the packet is written and the transaction is committed. There is decrement of the counting semaphore by the number of packets per thread, and when the counting semaphore reaches zero the boxcar contents are safely on the database and the boxcar can be freed.

A drawback of using boxcars is that the request thread in the Logger needs to wait until all packets have been successfully written to the database, in order to have certainty that no data can be lost. Unfortunately the dispatch of the boxcars is under the control of the boxcar threads. The solution is to tag every packet with an identifier for the thread that submitted it, and let the main thread wait on a counting semaphore. Once the packets have been dispatched and the method call returns, indicating successful insertion of the packets into the database, the boxcar thread decrements the counting semaphore for every packet associated with a specific tag. Once this semaphore reaches zero, the main thread can return safely with the knowledge that all data allocated to it is on the database.

The cost of this is low, but under high load, the system can handle much higher throughput.

The Alerter is very much a fast-path process to react to emergencies. The Alerter again processes packets in a function tree and attempts to come to a decision whether a specific packet mandates issuing an alert. This function does not stop processing when a signature is matched, so that correct alerts are raised, should a packet match more than one signature. In order to make the decision to raise an alert, queries against the database, issued through the Query Server, can be submitted. How alerts are handled is discussed in the next two sections.

The Alerter needs to do an early return to the Logger, and it is thus not guaranteed that the Alerter will process the packets. If it dies while processing the packets, the associated reactions will be lost. This will be discussed again when describing the functions of the Surveyor. The early return is mandated by the fact that the boxcar with packets needs to be held on the Sniffer until the call from the Logger returns. As determining a reaction can take an indeterminate amount of time, after all, database queries may be required, it is unacceptable from a resource allocation point of view to hold the boxcar on the sniffer until all reactions have been determined.

The delivery of a fast path action is not guaranteed in the case of the Alerter dying, as the Alerter does a quick return to the Logger, and the suspect packet is only stored in an internal buffer in the Alerter after that point. The Alerter is running in a server class, so will be re-started whenever it dies. As its first action it notifies a special Surveyor-style process that scans all recent packets and checks whether urgent actions are required. This surveyor will look at all high-priority packets over a short time period, and issue alerts for them as described above. As all alerts are written to the database through a server class of Alert Query servers, de-duping is taken care of there.

Figure 10:
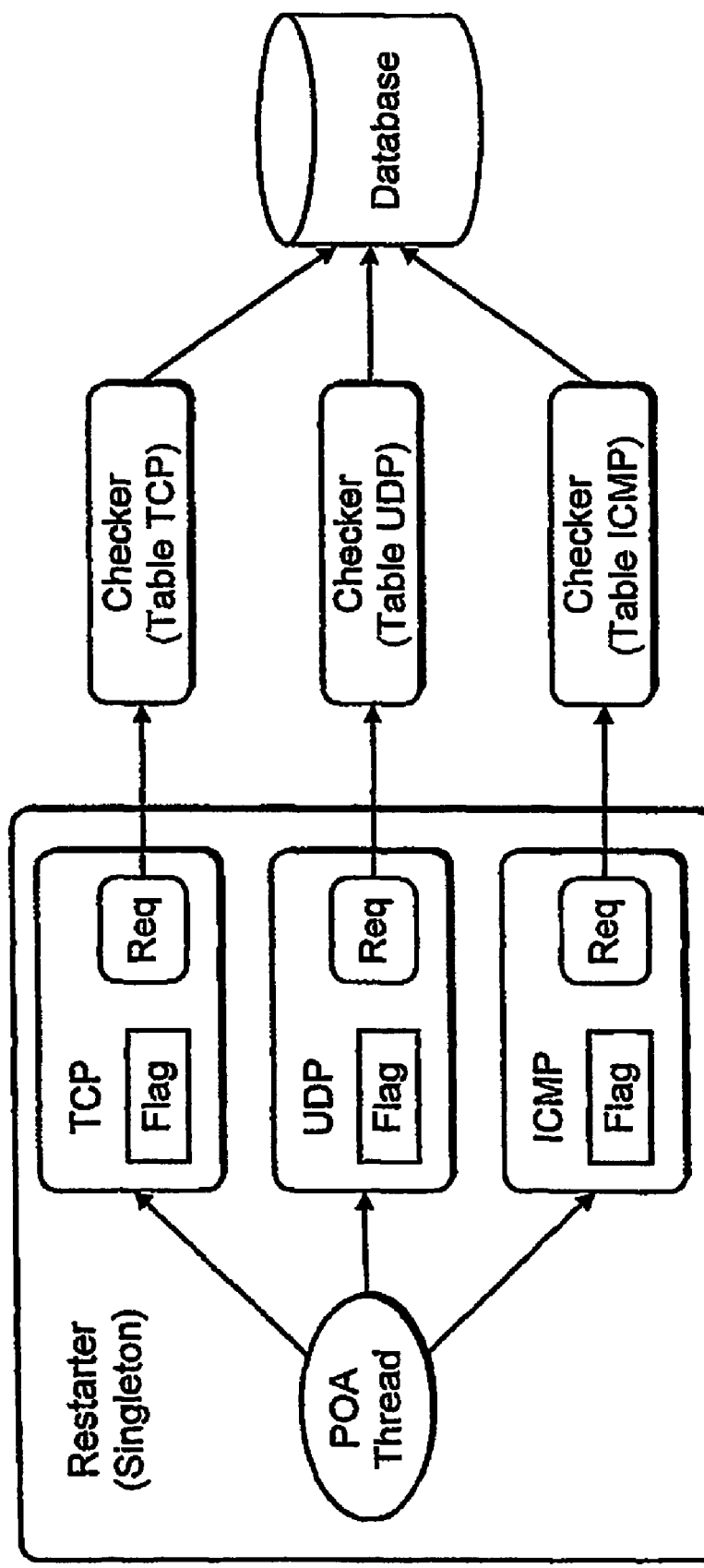
FIG. 10 illustrates a restart process for alerters.

This scan could be done from within the Alerter process, but it would make the start-up time for the Alerter very long. Furthermore all Alerters will be requesting this scan if a server class starts up, which is unnecessary and undesirable. Consequently, it is better to have a single process that handles the re-scanning, as shown in FIG. 10. Inside the singleton restarter there is a thread per table (in this case TCP, UDP and ICMP) that manages the request on a separate bank of processes, that are responsible for scanning individual tables and processing the packets through a tree identical to that found in the Alerter.

FIG. 10 illustrates the restart process for the Alerters. All Alerters contact the Restarter process, which contains a thread for every table. If the flag is set, the request is ignored, as a process will be busy scanning the table, so that the restart of a server class will only cause a single scan of the tables.

An advantage of having an IDS integrated with a database, is that it is possible to keep track of changes to certain classes of machines and adjust the log level of an alert accordingly.

Assume that TCP wrappers are configured so that port 25 (for example) appears to be in the "listen" state even though the machine is, say, a web server. This allows information gathering on the attacker without compromising security.

When the attack is reported, the rules check against the list of mail hosts, see that the machine is not a mail host and stores the information for later perusal. If however such an attack comes in, and the machine is a mail host, it may have to be reported to the analyst immediately. Because in this example the target is a web server without a real SMTP service listening it is possible to use an SMTP Alert triggered by a fake SMTP service to re-direct the intruder to a honey-pot to further analyse the attack.

Machine classes are defined as sets of IP address and port combinations. For example one could have "webhosts" and "intelhosts". The problem with these classes is maintenance. It is envisaged that a network scan will be run to populate such classes on a regular basis. Ideally they would be maintained by the analyst but this often leads to the classes and the real machines being out of synchronisation. A regular scan can be used to populate the classes on a per-service basis and OS fingerprinting techniques can be used to populate the architecture/OS classes.

An example of the need for an architecture-dependent class would be to raise suitably the log level of shellcode (buffer overflow) alerts directed to machines with the correct architecture. It is immediately obvious that x86 shellcode directed to a SPARC system is a rather futile attempt and that it is probably part of a "random fire" rootkit. On the other hand, the same shellcode directed to a served port on an Intel system would require the log level to be raised. An example of this could be an FTP daemon buffer overflow.

A further distinction is an OS-dependent class. This would be needed in cases where a shellcode exploit was known to work against particular architecture/OS combinations. An example is the FTP daemon buffer overflow which is present exclusively in x86 OpenBSD up to an un-patched version 2.8 system. The same BSD-derived FTP daemon runs under Debian Linux on x86 but is not relevant due to alignment differences. A more trivial example is offered by a Solaris system running an Apache web server. There is little point flagging as urgent a Windows NT IIS (trade mark) attack against a Solaris Apache server.

These machine classes are used in various rules throughout the system as so-called Macros.

As regards the queries that are required to distil information from the data kept in the database, many of these may be expensive queries, but many of them can be standardised. To cope with the preferred embodiments of use data series servers that keep statistics on certain quantities are provided. In the system described herein, five types of data series have been defined, but due to the distributed nature of the system, it is easy to add more.

In one embodiment the current data series all collect data over 10-minute time intervals, and keep distinct statistics for every sniffer.

Port attempts: The number of connection attempts that triggered alerts to certain well-known ports.

Source-based: The number of packets logged that originated from a set of well-known hosts, i.e. hosts that we have in our hot-list as suspicious.

Dest-based: The number of packets logged that are sent to a set of well-known hosts, i.e. hosts which are in one of our defined classes (see page 14).

ICMP packets: Jumps in the numbers of ICMP Dest Unreachable or, even more interesting, Source Quench, packets.

Alert numbers: The number of alerts for certain classes of alerts (e.g. alerts) that were raised.

The data series server (DSS) recalculates these statistics intermittently with a slight delay (the system needs time to put the packets into the database). The data series servers can be configured so that they do not all update at the same time, to reduce contention on the database. Every data series server will send the newly calculated items to an Alerter that looks at the data series items, may do some additional queries (see on queries), and generates new alerts if necessary. In the function tree in the alerter, it is possible to put hooks, so that certain classes of packets are sent to specific Surveyors. These will do additional checks against the database and generate new alerts if necessary.

The data series servers also act as servers to supply the latest values of the various aggregates that are calculated. They do not keep this information in memory, but in a database table—with the type of caching on the preferred platform there is no speed difference, and the code is much simpler.

A second set of calculations that the DSS servers supply are means over time. These are often more useful to see trends than just 10-minute statistics, and it is also possible that the analyst misses something that happened during a 10-minute time interval, but the averages will still show a peak some time later. Standard time series averages that update with every new 10-minute time interval are calculated, with mean look-back times of 30 minutes, 1 hour, 12 hours, 1 day, 1 week, 2 weeks and 1 month.

It could become expensive to store these for every single 10-minute time interval—after all, they need to update whenever there was an item somewhere in the history for that particular combination of sniffer and parameters. As a compromise the latest averages are stored in a database, and whenever a new item comes in, the are updated. Re-calculating the averages over a longer time period is relatively fast, and can be done when a graph is requested by the analyst.

Keeping the latest averages in a database also makes it quick to restart the data series server, as it can read the last row of averages and update from there.

The different types of data series servers are now discussed in some more detail.

1. Port-based Data Series

This assumes that the relevant protocol has a concept of ports as in TCP over IP or UDP over IP. The rationale behind port based information is to determine when we are facing concerted attacks on specific services. The number of ports to monitor is not that large, perhaps only about 10-20. These statistics are kept per sniffer, and per protocol type (i.e. separating UDP from TCP).

For ports the preferred system only stores statistical data for white-listed ports. This makes the port/host table manageable.

Standard open ports assumed in a basic white-list are:
SSH (22)
SMTP (25)
HTTP (80, 8080)
HTTPS (443)
WEBCACHE (3128, 8080)
PPTP (1723)
DNS (53)
IDENT (111)

The first of the host-based statistics is to detect accesses from hosts that are known suspicious, i.e. are in the systems hot list. If increased activity from one of these hosts is detected, this is important information even if the individual packets look relatively harmless. An example is port scans, which are not usually reported to the analyst. If port scans are detected from known bad hosts, this needs to raise an alert or be used to raise the overall log level of a separate alert.

This is also essential for Reactor router re-configuration or honey-pot re-direction. New attacks from a system in the hot list should be immediately dealt with by the honey-pot if other traffic is already re-directed to maintain the "illusion".

The second set of the host-based statistics are attempts per set of destination machines. These sets should be something like all web hosts, as discussed in the section on macros. It is reasonable to have machine groups being stored as opposed to individual machines if the number is high, since the question normally is "why is there a jump in Web Alerts?" which is immaterial if the machine is not a web server.

In addition the system should preferably be able to scan the packet table for specific IP addresses efficiently even if not particularly fast. The kind of query which will be asked is as described below:

An ICMP based data series keeps track of interesting ICMP traffic regarding boxes. The source and destination address, as well as UDP/TCP ports from the payload of relevant ICMP packets are stored separately in the ICMP packet table. It is thus possible to observe jumps in traffic involving "Martian" nets, or a large number of strange ICMP re-directions. These statistics are kept by type of ICMP packet.

It is of interest if the site on which the system is running is being used as a spoofed source for DDoS attacks. In this case a large number of ICMP Source Quench and/or ICMP Destination Unreachable packets would be received. These could be analysed to identify the destination of the attack and report this to the upstream ISP.

Alert-based data series: Alert-based information is useful to determine what type of attacks are seen in specific parts of the system. Alerts are categorised into just a few larger classes (web attacks, mail attacks, etc.) and statistics for every alert class are kept per sniffer. This enables the analyst to get a quick overview of the level of attacks in different parts of the system. Restarting the servers for these series is straightforward and fast with the data that is stored in the database.

Alerts are generated by various modules in the system, primarily all Alerter, which processes packets considered very dangerous on a fast path, the data series alerter, that processes statistics from the data series servers and Surveyor-style processes, which trawl the database.

There are only a limited set of alerts, for example about 20. These classify packets into classes such as web-attacks, windows attacks etc. Most alerts thus have two parts to them:

1. The alert id, e.g. web attack
2. The function id, which is essentially a signature key, identifying a packet as containing a specific web attack.

Once an alert has been generated, the packets that led to that alert are linked to it via a set of mapping tables—one for every type of packet table. As new packets generating the same type of alert are discovered, they are simply linked to this alert, rather than generating a new alert every time. As the number of packets linked to an alert increases, the alert level can be increased, or a new more serious alert can be generated and linked to the first alert.

Alerts also have a limited life-span of, for example, 15 minutes. This is to ensure that packets do not get linked to very old alerts, and there is always a current view on alerts.

In the absence of front line alerts, the database engine attempts to match a larger set of sophisticated patterns, and if so raises an alert and takes action. These are executed by a set of Surveyor objects. These include searches for slow scans, looking for similarities between suspect packets that point to concerted attacks or information gathering, as well searching for attack patterns to identify specific root kits.

There are several versions of these surveyors, all matching different sets of patterns to the database. Some surveyors are running continuously at low priority and use up any spare CPU capacity to apply rules to the packets in the database, while others are triggered by the arrival of data to do specific types of database searches. Whenever a suspicious pattern is found, the appropriate alert is raised.

There is an unlimited number of surveyor designs depending on the interests of the analyst. In a preferred embodiment a number of these are pre-designed in and are:

Reactive Surveyors: in the event of a volume-based alert, for example a Portscan Alert, it might be interesting to check if the Portscan Alert was being used to mask an underlying, more sophisticated, attack. On sudden surges of activity a Reactive Surveyor can be started to analyse the Alerts in the time-period considered by the volume-based alert. This Reactive Surveyor would concentrate its attention on the Alerts which were not part of the volume-based Alert.

Slow-scan Surveyors: One of the issues with current IDS systems is that the horizon of events is rather restricted. Data quickly accumulates and interesting parts of it can be drowned in the noise of the script kiddies. This surveyor will trawl the database searching for very low-key events which might be much more dangerous. A determined intruder will not show himself up with noisy portscans or random port attempts but will slowly probe the network for vulnerabilities. A possible design would be to search for small violations which have no follow-up, for example an isolated attempt to connect to a non-whitelist port after an ICMP Echo Request to the same host. Over a period of months the would-be intruder might collect enough information to then attack the systems.

Off-line Reactive Surveyor: This is identical in principle to the Reactive Surveyor mentioned above but searches for underlying stealth attacks during high-Alert activity off-line as opposed to the triggered response. The difference here is that the time period is higher and the search scope much larger. In practice it is a faster version of the Slow-scan Surveyor as it only analyses a limited number of time-periods.

Information leakage Surveyor: Along with special sniffer functions collecting outgoing data of certain forms (e.g. SSH traffic), the information leakage of a site can be analysed off-line. For example if the out-bound SSH traffic from a site increases dramatically just before an information leak is discovered then this Surveyor might help in finding the culprit. This can also be linked to tagging rules where particular tags are checked in documents. An example would be the monitoring of the movement of a Word Document containing the keyword "2001 Budget" within an organisation. Should it appear on sniffers monitoring networks where it should not be, then an Alert would be triggered. This Surveyor would collect this kind of data.

Signature collection Surveyor: Another interesting off-line task would be the collection of new signatures. Although it might sound difficult to automatically extract signatures the class-based Alert system allows for generic payload checks to be performed. For example in the case of "Whisker" a new variant on the long path trick could be developed. This might trigger a Web Alert but only because it was directed to a non-Web host (and hence falls under the "wrong box, don't care" rule). Then this Surveyor would check such mis-destined packets and see if they match anything known in the rules. If not they could report this as something possibly new to investigate.

Router configuration/Honeypot Surveyor: A slow surveyor, trawling through the database to suggest router configuration changes and/or honey-pot re-direction which could enhance security. For example if a particular host is often the target of Web Attacks then it might be interesting to re-direct these to a honey-pot at the router. Although this might be suggested at the Reactor level discussed below, this could be a more thorough optimised version (for example using CIDR block aggregations where possible).

Other Surveyors can be added with relative ease: the key design principle is that there should be separate Surveyors for each task as opposed to a huge monolithic one. They are then run with differing priorities and time intervals on the Compaq Himalaya.

The purpose of the Reactor is to coordinate the behaviour of the system to the outside world in the face of a stream of alerts offered by the Surveyor(s) and Alerter(s). The Reactor is responsible for determining whether and which reaction should be implemented, where one of the possible actions is to notify the analyst of an event.

1. Receive an alert, and decide whether this is a 'new' alert.
2. Decide which reactions need to be implemented on the basis of this alert.
3. Look at all the actions that have been taken, and decide whether this action is a duplicate or not. If it is a duplicate, link the two actions and return.
4. Log the action to the database.
5. Implement the action.

As multiple sources generate actions, the de-duping in the Reactor will not always work correctly, so client code must be prepared to deal with the occasional duplicate action request. The possibility of duplicate actions being generated is small, but, due to the distributed nature of the system, cannot be eliminated completely.

The Reactor will take whatever actions are necessary, and will always pass all actions to the Message Server, which is responsible for submitting them to the user interface, and under certain circumstances to send alerts to pagers, mobiles etc.

A key consequence of building up a database of patterns for rootkits is that it is possible to determine whether a specific alert is part of standard rootkit attack. The main advantage of this is that the number of alerts that are reported to the analyst can be significantly reduced, by simply reporting that 'rootkit X was used from address A with this set of spoofed addresses' instead of a large number of individual alerts. As most attacks resulting in a large number of alerts are from known rootkits, this results in a significant decrease in the number of incident reports that the analyst needs to handle.

Pattern matching to recognise rootkits is hard, as fuzzy matching of alerts to a pattern is required. Attacks are usually accompanied by a large number of packets with spoofed addresses, and it is necessary to determine which addresses are spoofed. Furthermore parts of an attack may get lost, and rootkits increasingly have sources of randomness built in. Nevertheless it seems possible to identify a large number of standard rootkits and derivatives thereof.

A further consequence of being able to recognise rootkits is that the system acquires a predictive quality: once part of a rootkit pattern has been matched, it is possible to identify the set of rootkits matching this pattern and thus the set of attacks that can be expected. In that case it is possible to determine whether these attacks are considered dangerous or disruptive and whether preventative action can be taken (e.g. throttling some traffic at a router if a ping flood is likely).

Figure 11:
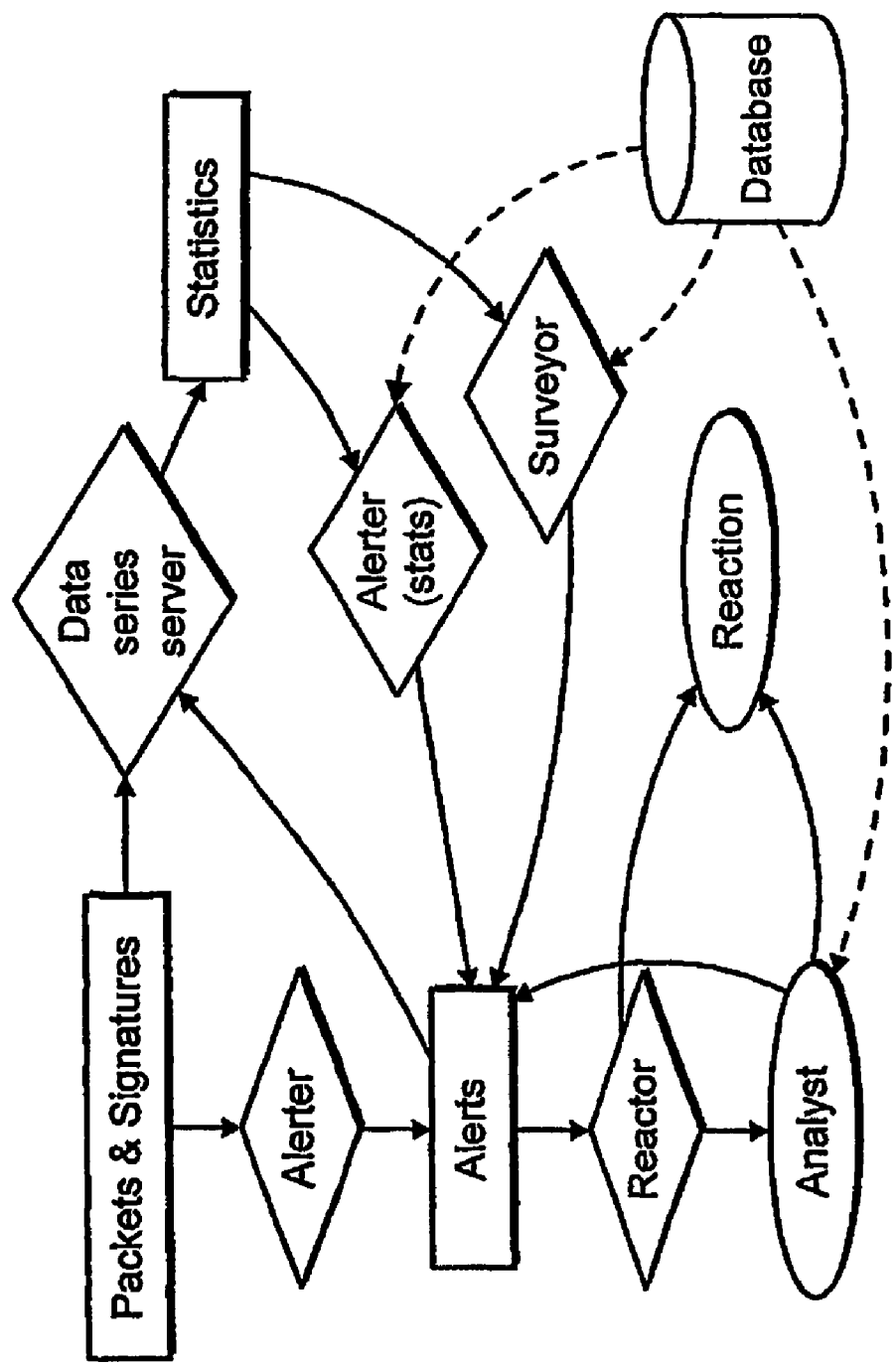
FIG. 11 is a schematic of feedback loops in the determination of alerts and reactions.

FIG. 11 is a schematic of the feedback loops in the determination of alerts and reactions. Packets that satisfy specific signatures raise alerts. All packets, as well as the series of alerts are picked up by data series servers, which produces statistics, which can in turn lead to new alerts. The statistics, or timers, trigger Surveyor processes, which can trigger alerts in turn.

In FIG. 11 the various dependencies between the different information flows are shown. High priority packets are sent to the Alerter, and may raise alerts. These are stored to the database, and passed to the Reactor to determine whether notification of the analyst or a specific type of reaction are warranted.

The Data Series Servers trawl both the packet tables and the alert tables and calculate standardised statistics from these. These values are passed to an Alerter for stats data, and may in turn lead to a new alert being raised. Alerts are also passed to Surveyor(s) which can look for patterns triggered by an alert, or by trawling the database at periodic intervals. The surveyors can in turn raise alerts, which are passed to the reactor.

The analyst receives the alerts that the Reactor deems important, and can also monitor statistics independently. Should the analyst decide that intervention is warranted, alerts can be modified (i.e. upgraded or downgraded in importance) and reactions can be initiated.

On the database server all SQL queries are process blocking, so that it is not advisable to do any queries from a multi-threaded servers. The Query server is a bank of single-threaded servers that execute canned queries on the database. This enables processes such as the Alerter, Reactor and also the analyst to query the database. It makes it possible to re-use queries and it simplifies the coding of these servers.

The query server also contains canned queries for the common information required by security analysts when investigating specific events. These queries will include searches for specific patterns, similar attacks etc.

A few examples are:

1. Finding all packets that were logged from a specific host by all sniffers, or one specific sniffer.
2. Finding the host(s) that led to specific alerts being triggered.
3. Given a sudden increase in the number of logged packets directed at specific ports, producing a histogram representing the specific packet/port values.
4. Attempting to match an attack pattern to the attacks in a specific time period. This would make use of pre-stored rootkit patterns with or without a certain amount of allowed "fuzziness".
5. Finding similar Alerts across all sniffers directed to machines in the same class as the one being reported (if it is a single machine).

Due to the way the query server is implemented, it is very easy to add new queries to it. When executing canned queries it is much easier to judge the impact of the query on the total system load, than if using general SQL queries.

Managing the preferred system needs to take account of the continuously changing network environment, as well as having to cope with new attacks and additional monitoring requests. As always there are trade-offs between flexibility and speed, and in a real-time system, handling very large volumes of data, the trade-offs will generally be biased towards speed.

In the preferred system, speed is achieved by having hard-coded units performing certain functions, and flexibility by being able to specify how these units are linked together. An example of this approach is the function tree discussed earlier.

A second problem is to be able to express the flexibility in the configuration of the system in an easy to understand and portable way. Here the flexibility of XML is an advantage. There are many tools available to manipulate XML strings, and in one preferred embodiment the system makes use of the Xerces (Trade Mark) libraries for this purpose.

The configuration of servers is stored in XML in the database and the configuration server serves this to the processes on start-up. From the front-end the configuration can also be requested, modified and stored back to the database, in which case it will take effect the next time the server is restarted. An alternative is to modify the configuration of an object directly and instruct its management object to store the updated configuration to the database.

In the front-end visual methods for adding rules, as well as translators for rules from other IDS's can be added that generate the desired XML for various IDS rules. There is for example a translator from Snort rules to the XML representation available.

Whereas, in the preferred embodiment, the high performance kernel of the system is developed using C++, the front-end of the system is developed using the Java 2 platform. This choice enables the development of a highly portable and advanced user interface. Since the front-end does not need to access private resources of the client machine, it could be embedded as an applet in a web browser.

The main functionalities offered by the front end include:

Basic reporting facilities: A simple, easy to read, display giving an overall view of the situation with a colour-coded guide to the current threat level, for example matching the SANS GIAC colour coding standard;

Sophisticated overview: Packet statistics, attack statistics, sniffer load, historical correlations etc.;

Alert analysis: An extension of the above with the additional possibility of placing queries directly to the database engine, either in SQL or a simplified subset to allow analysts to probe particular attacks or packet patterns;

Maintenance mode: Extending attack patterns, exporting subsets of the database to comma-separated values or IDS interchange formats, such as the CERT-endorsed SNML in the CVS snapshot of Snort for export to different databases (for example Mobile-DB on the Palm (Trade Mark));

Configuration: Configuration of the system by interacting with the individual components, setting parameters and storing the new configuration to the database; and Interrogating objects: Determining the state of objects interactively, e.g. when querying functions that collect real-time statistics on network traffic.

As is common with user interfaces, the front-end needs to hide the global complexity of the underlying system for daily tasks, while allowing the management of each component when needed. It provides a uniform interaction interface for each accessible object, independent of the physical location, whilst allowing strict control over the range of available operations.

It remains that the front-end will only enable to interact with the capabilities offered by the different services. As an example, the database enquiries will strictly follow the set of queries offered by the Query Server The design of the user interface preferably follows the standard of contemporary user interfaces in term of general 'look & feel', internationalisation and reactivity. Preferably, attention is paid to security and roaming access, by employing an n-tier architecture.

Access to the system is based on the notion of roles. A role is related to a set of capabilities accessible to a particular group of users accessing the system from a particular network. In order to prevent attacks on the IDS itself, the front-end gateway can decide to downgrade the access privileges of a certain user accessing from a particular network. Finally, since the personal configuration for each user is saved on the server side, the user will be able to access the different tools remotely while keeping his standard workspace (with non-local access possibly forcing a downgraded role value).

Figure 12:
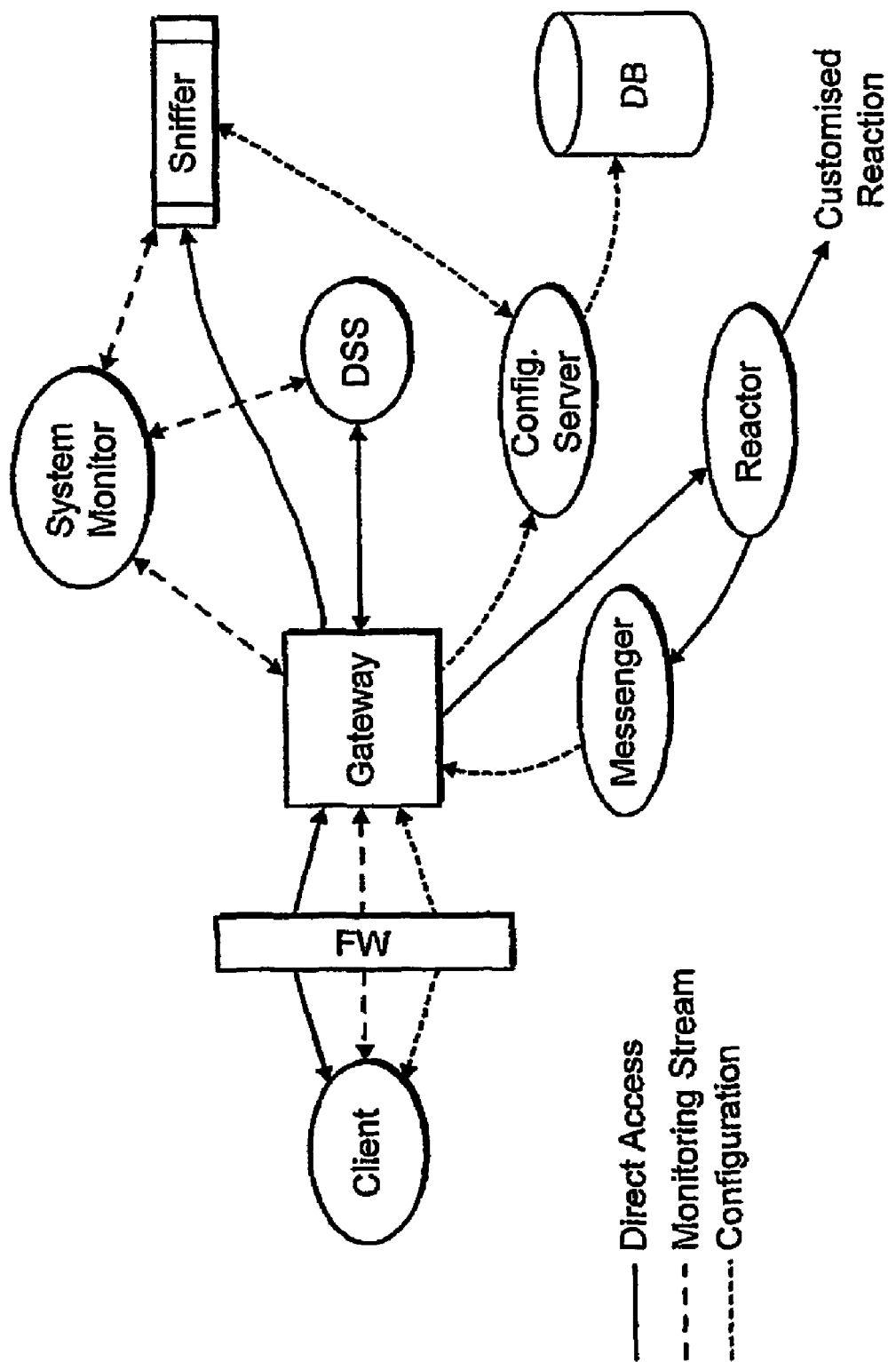
FIG. 12 illustrates a communication path.

The standard communication path between the system core objects and the front end is described in FIG. 12.

The front-end architecture relies on a standard n-tier architecture, where each component in the middle-ware architecture plays a specific role.

The front end gateway is the only entry point from the external network, via the firewall, to the analyst's GUI client. It is responsible for the identification of users and the management of the different incoming sessions, and in the preferred embodiments the authentication phase will be delegated to the firewall. It is also responsible for filtering the requests based on the privileges granted to a specific user. According to a privilege schema (the role of the user), it exhibits a specific view on the system objects and forbid some interactions.

A specific subset of the system objects may offer an interface to the user as well as other external services. This is particularly the case for the different objects such as the Alert server, the Query server, the Reactor and so on.

Obviously, while these components are loosely coupled with the front-end, they are not elements of the front-end itself. In developments of the system, there could be other components to facilitate the work of the IDS analyst (report generator, traffic monitor, etc.).

With reference to FIG. 12, the user interactions are classified in three main groups:

Configuration: All of the interactions belonging to this group are forwarded to the Configuration Server, which is responsible for centralising the configuration of the system and maintaining its persistence.

Monitoring: In a similar way to configuration, the monitoring requests are centralised on a system monitor. The monitoring resources this component provides are lease-based. Each client wishing to follow the status of a specific part of the system can subscribe for the associated set of events for some period. The system monitor is then responsible for gathering this information and pushing it regularly to the client. If a lease is not renewed the system monitor will then stop pushing the information to the client. When no other clients are interested in the same information stream, the system monitor will itself un-subscribe from the object. This subscription mechanism prevents overload of time critical components while the lease based mechanism avoids pushing the information to ghost clients Direct Access: Finally, for non-periodical interactions some services will propose direct interactions between clients and objects within the system. One such object might be a Data Series Server (DSS) which, complementary to real-time subscription, will offer historical data series for the purpose of Alert Analysis.

The communication path discussed above enables interaction with the different components of the system in a secure way, assuming the following:

Private network: The internal security network should be separate and reserved to the sniffers and the principal server. Should this not be possible then each sniffer will run IPsec locally and traffic will be directed to an IPsec gateway forwarding packets to the principal server. This will be transparent to the application as IPsec routes packets via the secure link by encapsulating IP.

Firewall: The private network can only be accessed via a firewall, which blocks any incoming request which is not addressed to the Front-End gateway. The connection to this gateway is encapsulated via SSL.

Authentication: Authentication takes place both at the access level and at the application level by means of user/password or user/SecureID combinations. In the case of application-level security different authorisation levels should be defined (read-only, read-modify, read-modify-create, etc. depending on the required granularity).

Since the communication between the front-end gateway and the private network relies on CORBA, the only legal interactions which are triggered by the gateway concern the calls to object methods which are part of the exported services. Direct interactions with the internal file system or with the database will not be supported and simply rejected by the system.

The gateway is responsible for storing the different user configurations and mapping the combinations of user and accessing network to each role.

The front-end enables an analyst to monitor the status of the network. The analyst screen is composed of different zones:

Near real time alert zone: The incoming alerts will be reported in near real time through a scrolling list. A colour code will be associated with the severity of the alerts. Selecting an alert will open it in the alerts analyser area.

Alert analyser area: The alert analyser displays the further information regarding an alert (packet, network concerned, reasoning involved) necessary for further analysis.

Knowledge base area: This area will provide further in-depth information to assist the analyst, including access to security web-sites, mailing lists, etc. In order to further help the analyst, this area will provide quick access to the main security source of information. This knowledge base area will rely on the indexation of the main web sites and mailing list dedicated to the security.

System monitoring area: the interface will regularly receive statistical information regarding the time critical system objects (i.e. sniffers, logger and reactor) and display them in a graphical way. This area will give quick access to the configuration interface which is described below.

The alert analyser will display, on request, further information regarding an alert (packet, network concerned, reasoning involved). Each alert will be presented together with different associated actions. These actions include possible responses to an intrusion but also options for further analysis of the alert.

Information Gathering

Analysing an Alert mainly requires the gathering of more information from the database via the Query Server, to:

Discover recent Alerts of the same or related class;

Discover Alerts coming from the same source;

Discover Alerts sent to the same destination;

Query the main database with complex Alert-related queries (for example isolating sequencing or spoofing artefacts).

In order to evaluate the danger of this threat, it could also trigger a query to the hosts database or a refresh of this database. Alternatively, the analyst may request the gathering of information from the knowledge database in order to check recently reported attack schemes.

A large variety of responses may follow the analysis of an alert. It is possible to classify the different responses in four main groups:

Passive counter-measure: Firewall adjustment, software updates.

Active counter measure: Redirection to a 'honey pot' system, counter-attacks where permissible.

System reconfiguration: In order to eliminate false positives or to gather more information. This could imply reconfiguration of the sniffers (monitor all packets coming from this address/network), the reactors (no longer report such alerts/modify the severity), or the surveyor (rescan for a specific attack pattern in this last week).

Alert report: Report all alert by sending notification to other analysts or CERT.

Preferably, alert cross-checking is possible. The analyst will be able to tag an alert together with relevant information (checked with a possible interpretation, to further analyse in detail, for example) and to generate a report. On request, the whole set of available information related to an alert could be stored in a safe place in order to avoid the automatic reduction of data.

Complementary to these services, the alert analyser will offer to "manually" regroup set of correlated alerts. These sets of alerts could then be stored as 'Macro alert' and be reported at once, but could also be used to refine attackers profile.

Each component of the preferred system is responsible for implementing different configuration interfaces. These interfaces enable the end-user to browse the main objects in a similar way.

These different generic interfaces are as follows:

Principal server interface: This enables the setting of some specific configuration parameters on the principal server, e.g. to modify the configuration of server classes;

Daemon interface: This allows the analyst to start/stop/restart/suspend a specific object;

Status interface: This returns basic information on the object status (active, sleeping), work statistics, number of instances, etc.;

Configuration interface: This enables the retrieval or modification of the XML configuration.

As previously described, the configuration of each service will be described in an XML file conforming to different XML schemas which define the required syntax, structure and semantics of XML documents. These configurations are centrally stored in the database managed by the Configuration Server.

These different capabilities will initially be accessible to a user by means of a GUI similar to an advanced file browser in order to be user friendly and quickly usable. For large-scale organisations, for example, it is possible to offer a view taking into account the location (physical or logical) of the components, similar to HP OpenView (Trade Mark).

It is important for the performance of the system at wire speed that there are no bottlenecks between the actual data path it is monitoring and the IDS core on the database. In one preferred embodiment, the hardware is as follows:

Sniffer: Top-end PC or Alpha workstation, dual 1.2 Gbit/s ATM cards or GBIC/ATM combination (ATM required to interface to the preferred principal server), running OpenBSD or a security-enhanced version of Tru64 Unix, large memory to avoid touching the disk for swapping, high speed internal SCSI disk (U2W) for spill-over;

Principal database server: Compaq Himalaya (Trade Mark) multiprocessor, ATM card for each sniffer, Fast Ethernet cards to serve analyst consoles, ample disk space;

Front-end: Simple PC, not necessarily dedicated.

Optionally the reaction modules and the web server can be moved off the principal server on to low-cost PCs running Unix.

The powerful packet collection system described above could also find other uses beyond intrusion detection, and for example:

Company-wide internal security: Sniffers placed in different locations within a company's Intranet would make it possible to pick up confidential data being sent by unencrypted e-mail or disallowed network usage;

Cyber-nanny: This would allow semi-automatic detection and blocking of unsuitable sites. The action on detection would simply be to firewall the site or force redirection of traffic;

Traffic analysis: large sites could use the spare capacity, if any, to analyse and improve their Internet traffic. It would act as a very sophisticated form of the standard tool mRTG. Indeed, SNMP adapters for the present system could be developed for this purpose.

The expression "suspect network traffic" used herein is therefore to be construed broadly, with regard to the context in which the system is used.

The run-time reconfiguration of the function trees in the Sniffer and Logger requires some special consideration, due to the multi-threaded nature of these objects. Frequently the STL data structures used within a particular node of a tree cannot safely be updated by one thread whilst other threads might still be traversing the sub-tree beneath that node. Therefore care must be taken to perform updates of the function trees in a thread-safe manner (although, of course, many of these problems disappear on the preferred principal server with its non-preemptive threads). The problem is further complicated by the need for efficiency, which rules out the use of mutex locks.

A preferred solution to this problem is as follows. When a non thread-safe change to the function tree is requested at a particular node of a function tree, the change is made to a duplicate of the relevant data structure. While this is done the original data structure remains active for all threads arriving at the node; the duplicate is not accessible to these threads whilst it is being modified. Since the data structures simply contain pointers to sub-tree nodes, the sub-tree is entirely unaffected by the duplication (in particular, sub-tree nodes are not themselves copied). Then, once the new data structure is complete and ready for use, it is made active by a single atomic pointer update.

From this point on, any threads which newly arrive at this node of the tree will use the new data structure, and for these threads the change to the function tree is effective immediately. Threads which were already traversing the sub-tree of the node at the time the change was made will continue to use the original data structure until they leave the sub-tree altogether, after which they, too, will use the new data structure. The difficulty is to establish at what time it is safe to finally delete the old data structure, i.e. that is, when it is known with certainty that no threads are still using it.

This is done by the introduction of a function tree worker monitor which keeps track of the progress of the threads which are processing data through the tree. As each thread enters the function tree, it informs the worker monitor of the sequence number (or time-stamp, as applicable), of the data item (i.e. packet, alert or whatever) it is processing. Likewise, each thread notifies the worker monitor when it leaves the tree. When a change is made to a particular node of the tree, and after the new data structure has been made active, the old data structure is 'time-stamped' with the sequence number of the 'most recent' data item to have been sent into the tree, information supplied by the worker monitor. It is then known to be safe to delete the old data structure when all the data items currently being processed through the tree have sequence numbers later than that recorded at the time the new data structure was activated. The worker monitor can be requested to wait until this condition is true. However, since no attempt is made to delete the old data structure (which takes up only a minimal amount of memory) until the next change is made to that node of the function tree, the wait time will generally be negligible.

the sequence number that is acknowledged is 0. The complete hex dump of the packet is also shown. The first 20 bytes are the IP header, followed by the TCP header and the payload.

| 2001-08-07 20:23:06 TCP 172.16.1.14:80 –> 195.212.241.243:41363 A | | | | | | | |
|---|---|---|---|---|---|---|---|
| 0000 ...Y/.....Y.bv.. | d701 | d059 | 2f17 | acd7 | 01d0 | 5914 | 6276 | 08d7 |
| 0010 .E....<.I....0.. | 0145 | d701 | d701 | 3c85 | 49d7 | 01d7 | 0130 | 06a2 |
| 0020 ................ | 8cac | 1001 | 0ec3 | d4f1 | f3b2 | a1a1 | 93b4 | c109 |
| 0030 ..............O. | 8ad7 | 01d7 | 01d7 | 01d7 | 01a0 | 1004 | d701 | 4fbf |
| 0040 ...............?? | d701 | d701 | 0303 | 0a01 | 0204 | 0109 | 080a | 3f3f |
| 0050 ??............ | 3f3f | d701 | d701 | d701 | d701 | d701 | | |

It is possible, although unlikely, that duplicate alerts can be delivered from the Reactor. This may be difficult to avoid, and consequently client processes should be prepared to deal with duplicate alerts, or singleton processes need to be inserted that do any final de-duping.

The argumentation is as follows:

1. Assume two action sources receive data that leads to the same action to be generated. Both sources check the database, find no previous version of this alert and decide to insert it. Before inserting they retrieve a new action number from a single process that issues action numbers.

2. If one source commits a bit earlier than the other, it will call a Reactor with the action, the Reactor will scan the database, find no duplicate action, initiate the action and mark it as acted upon. When the second source submits the action to the Reactor, it will see that the action has been handled, merge the actions and ignore.

3. If both sources insert and commit the alert at the same time and report it to two different instances of the Reactor, both will see both actions as not handled. In a case like this the action id can be used to de-dupe it. The Reactor with the higher action id simply exits and leaves the other to deal with the alert.

4. It may be possible for the two sources simultaneously to generate identical actions, say with action numbers 315 and 317, but there is a delay in the processing of the action 315. Action 317 is transmitted to a Reactor, who scans the database, discovers no identical action and initiates it. In the mean-time action 315 is committed and sent to an alternate Reactor, who scans the database, sees action 317 but does not see that it is being acted upon as it has not been marked as such yet. Having an action number that is lower than 317, it decides to initiate the action and consequently the action is initiated twice.

Duplicate actions will be very rare, but there is nevertheless a very real chance that they can occur: especially when a source launches several attacks from the same source, multiple actions leading to an action request to block the source address may hit the system more or less simultaneously. As the system will be under strain, it is very possible that the order in which action messages are numbered and reported will change.

Some particular examples of implementing of the system will now be described.

The following is a TCP packet resulting from an NMAP scan, which is used to identify open ports on systems. This particular packet is recognised because the Ack flag is set, but Such probes are the basis of information gathering on target systems. Most port scans are hard scans, i.e. scan a whole range of ports and machines in a short space of time. Stealthy scans would only probe single ports with large intervals in between.

The system will log all such scans, but not report them through to the analyst. When scanning the database recurring source addresses from single probes will be picked up and the source address will be put into the hot list so that future scans, as well as any following intrusion attempts, will be picked up and logged. This is important, as such stealthy scans point to more sophisticated hackers.

Fingerprinting a rootkit is difficult: It tends to consist of some recurring attack patterns and some randomness. A good fingerprint is made up of a number of distinct elements which are easy to categorise and then some fuzziness.

A rootkit could be made up of the following patterns for example:

1. "are you alive?" ping (ICMP Echo Request)
2. nmap SYN-FIN scan
3. if POP-3 is open then POP-3 daemon overflow
4. if FTP is open then FTP daemon overflow
5. if IMAP is open then IMAP daemon overflow
6. if PORTMAP is open then PORTMAP daemon overflow with the slight complication that what follows the nmap SYN-FIN scan can be in random order. This might seem a hopeless task, given that the above will be surrounded by lots of other packets but imagine this detection sequence where the interval is assumed to be small:

1. Src_2 ping to Dst
2. Src_0 ping to Dst
3. Src_1 ping to Dst
4. Src_3 ping to Dst
5. Src_1 nmap SYN-FIN to Dst
6. Src_2 nmap SYN-FIN to Dst
7. Src_0 nmap SYN-FIN to Dst
8. Src_3 nmap SYN-FIN to Dst There are individual entries for Src_0 through to Src_3 mapped to a single Dst. Of these sources three out of four are fake ("spoof") addresses which have nothing to do with the problem. One must be the true one otherwise no information would ever flow back.

The surveyor will consider these SYN-FIN scans as one, because the time interval is too small to imagine them being separate scans.

Assume that FTP and IMAP are both open ports. Consequently the sniffer will detect the second "series":
1. Src__1:1024 SYN to Dst:21 (FTP)
2. Src__1:1025 SYN to Dst:220 (IMAPv3)
3. Dst:220 SYN ACK to Src__1:1025
4. Src__0:1024 SYN to Dst:220 (IMAPv3)
5. Dst:21 SYN ACK to Src__1:1024
6. Src__0:1025 SYN to Dst:21 (FTP)
7. Dst:220 SYN ACK to Src__0:1024
8. Src__1:1024 RST to Dst:21
9. Src__0:1024 ACK to Dst:220
10. Src__1:1025 RST to Dst:220
11. Dst:21 SYN ACK to Src__0:1025
12. Src__0:1024 ACK to Dst:21

At this point the analysis is making inroads: the RST packets are used to indicate that the receiving machine received an unexpected packet. Since there is a SYN and SYN¯ACK pair it means that the initial SYN was spoofed. This eliminates Src__1 from the game. Src__0 is instead initiates a conversation, as shown by the ACK and hence must be the true perpetrator. This address is inserted into the hotlist.

The pattern that emerges is:
An ICMP Echo Request, nmap SYN FIN scan followed by FTP and IMAPv3 connections,
It is reasonably to infer that the nmap SYN FIN scan is used to determine what to do next (i.e. FTP and IMAPv3 since the ports are open),
The rootkit uses 4 spoofed addresses for the initial scan and 2 spoofed addresses for the intrusion attempt.

This can then be entered into a catalogue of "seen patterns"; To collect patterns of this type it is useful to have machines on the system that run TCP wrappers and respond positively to connection attempts. That way the complete pattern can be found, even if some of the services are not open on any real system.

From this discussion it is clear that a substantial set of data needs to be collected to make fairly simple inferences. Matching RST packets to initial SYN packets is best done in a stateful sniffer, that tracks TCP connections. By being able to identify at least some of the spoofed source addresses the analysis becomes much simpler. Piecing the remainder of the fingerprint together requires the data to be available in the database. Traditional IDSs do not have the capability to collect volumes of data that do not individually generate alerts and only use that data to piece together finger prints.

The invention claimed is:

1. A system for analyzing network traffic, comprising the steps of:
using detecting means including a tap which receives and selects packets of data from network traffic and packet creating means which, for each packet selected by the tap, creates a modified selected packet for analysis which consists of the selected packet and a unique identifier for the selected packet which distinguishes that selected packet from all other selected packets, wherein the detecting means analyzes the modified selected packets to detect suspect modified data packets which meet criteria defined by one or more functions in the detecting means, the criteria being indicative of potentially damaging traffic on the network;
forwarding details of each detected suspect modified data packet to data processing means;
storing details of each detected suspect modified data packet so as to be accessible for use in analysis by the data processing means in conjunction with the details of other detected modified suspect packets; and
using the data processing means to analyze the stored suspect modified data packets.

2. A system as claimed in claim 1 wherein the unique identifier includes an identifier for the tap and a time stamp.

3. A system as claimed in claim 1 wherein the tap carries out an initial filtering stage in respect of types of network traffic in order to select packets of data.

4. A system as claimed in claim 1 wherein the modified selected packets for analysis are filtered in order to detect packets which meet the defined criteria, by means of an adapter which enables the application of a function to part of a packet.

5. A system as claimed in claim 4 wherein a plurality of adapters are provided which enable the application of functions to different parts of a packet.

6. A system as claimed in claim 1 wherein packets received and selected by the tap are placed in a static buffer, and the packet creating means copies the selected packets from the static buffer into a structure allocated from a memory pool.

7. A system as claimed in claim 6 wherein the packet creating means puts a pointer to the structure in a buffer.

8. A system as claimed in claim 7 wherein the buffer grows dynamically to accommodate peaks in traffic.

9. A system as claimed in claim 1 wherein a plurality of taps are provided, each with an associated packet creating means.

10. A system as claimed in claim 1 wherein detected packets are collected and forwarded to the data processing means in groups.

11. A system as claimed in claim 10 wherein collected packets are forwarded as a group to the data processing means at predetermined time intervals.

12. A system as claimed in claim 11 wherein if the number of packets collected exceeds a predetermined limit before the expiry of the predetermined time interval, then the collected packets are analysed in accordance with predetermined criteria to establish whether only some of the packets may be forwarded to the data processing means as representative of a series of like packets.

13. A system as claimed in claim 1 wherein functions applied to the packets, to detect those which meet the defined criteria, are encoded into a function tree.

14. A system as claimed in claim 1 which is configured to detect suspect network traffic and provide alerts by means of an alert process in the event that an attack or potential network attack is identified.

15. A system as claimed in claim 14 wherein a logger forwards details of detected packets to the data processing means for analysis, the logger also forwarding details of high priority packets to the alert process.

16. A system as claimed in claim 14 wherein the data processing means includes a database server hosting a database on which details of detected packets are stored, and at least one data series server which queries the database to create statistics and provides information to the alert process.

17. A system as claimed in claim 16 comprising a plurality of data series servers which create different types of statistics.

18. A system as claimed in claim 14 wherein a historical analysis is carried out on details of detected packets stored by the data processing means.

19. A system as claimed in claim 14 wherein means are provided so that information concerning a number of detected packets which are related may be aggregated and a single alert provided.

20. A system as claimed in claim 14 wherein means are provided so that a list may be stored to identify network attacks on which resources are to be concentrated.

21. A system as claimed in claim 14 wherein means are provided so that a list of permitted data may be stored and all packets which do not correspond to this list are detected.

22. A system as claimed in claim 14 wherein patterns are identified in the stored data and used to predict the next sequence of packets if an attack is identified.

23. A system as claimed in claim 14 which is configured to detect a distributed denial of service attack as a deviation from normal traffic patterns.

* * * * *

UNITED STATES PATENT AND TRADEMARK OFFICE
CERTIFICATE OF CORRECTION

| | |
|---|---|
| PATENT NO. | : 7,594,009 B2 |
| APPLICATION NO. | : 10/380315 |
| DATED | : September 22, 2009 |
| INVENTOR(S) | : Triulzi et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1242 days.

Signed and Sealed this

Twenty-eighth Day of September, 2010

David J. Kappos
*Director of the United States Patent and Trademark Office*